(12) United States Patent
Basso et al.

(10) Patent No.: US 8,046,338 B2
(45) Date of Patent: Oct. 25, 2011

(54) SYSTEM AND METHOD OF ORGANIZING DATA TO FACILITATE ACCESS AND STREAMING

(75) Inventors: Andrea Basso, Ocean, NJ (US); Alexandros Eleftheriadis, New York, NY (US); Hari Kalva, New York, NY (US); Atul Puri, Riverdale, NY (US); Robert Lewis Schmidt, Howell, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 416 days.

(21) Appl. No.: 12/129,157

(22) Filed: May 29, 2008

(65) Prior Publication Data

US 2008/0228825 A1    Sep. 18, 2008

Related U.S. Application Data

(63) Continuation of application No. 10/785,905, filed on Feb. 24, 2004, now Pat. No. 7,428,547, which is a continuation of application No. 09/236,548, filed on Jan. 26, 1999, now Pat. No. 6,751,623.

(60) Provisional application No. 60/073,962, filed on Jan. 26, 1998.

(51) Int. Cl.
G06F 17/30 (2006.01)

(52) U.S. Cl. .......................... 707/687; 375/240; 714/18

(58) Field of Classification Search .................. 707/687; 375/240; 714/18
See application file for complete search history.

(56) References Cited

U.S. PATENT DOCUMENTS

| | | | | |
|---|---|---|---|---|
| 5,436,664 A | * | 7/1995 | Henry | 375/240.16 |
| 5,442,400 A | * | 8/1995 | Sun et al. | 375/240.15 |
| 5,537,408 A | * | 7/1996 | Branstad et al. | 370/473 |
| 5,652,879 A | | 7/1997 | Harris et al. | |
| 5,680,322 A | * | 10/1997 | Shinoda | 714/18 |
| 5,835,144 A | | 11/1998 | Matsumura et al. | |
| 5,970,490 A | | 10/1999 | Morgenstern | |
| 6,079,566 A | | 6/2000 | Eleftheriadis et al. | |
| 6,125,388 A | | 9/2000 | Reisman | |

(Continued)

OTHER PUBLICATIONS

Patrick Mulroy "VRML Gets Real The MPEG-4 Way" 1997 The Institution of Electrical Engineers, Printed and published by IEE, Savoy Place, London WC2R OBL, UK.

*Primary Examiner* — Yicun Wu

(57) ABSTRACT

File formats systems and methods are disclosed that provide a framework that integrates concepts, such as objects based audio-visual representation, meta-data and object oriented programming, to achieve a flexible and generic representation of the audiovisual information and the associated methods to operate on the audiovisual information. A system and method are disclosed for storing data processed from presentation data. The data is stored according to a method comprising coding input presentation data by identifying objects from within the presentation data, coding each object individually and organizing the coded data into access layer data units. The access layer data units are stored throughout a plurality of segments, each segment comprising a segment table in a header portion thereof and those access layer data units that are members of the respective segment, there being one entry in the segment table for each access layer data unit therein. A plurality of extended segments are also stored, each of the extended segments further comprising one or more of the access layer data units that include protocol specific data, the extended segments each represented by a extended segment header. The data of an accessible object is also stored, including an accessible object header and identifiers of the plurality of extended segments, each of the extended segments being a member of the same object.

14 Claims, 10 Drawing Sheets

U.S. PATENT DOCUMENTS

| | | |
|---|---|---|
| 6,138,147 A | 10/2000 | Weaver et al. |
| 6,282,548 B1 | 8/2001 | Burner et al. |
| 6,308,179 B1 | 10/2001 | Petersen et al. |
| 6,317,795 B1 | 11/2001 | Malkin et al. |
| 6,356,567 B2 | 3/2002 | Anderson et al. |

* cited by examiner

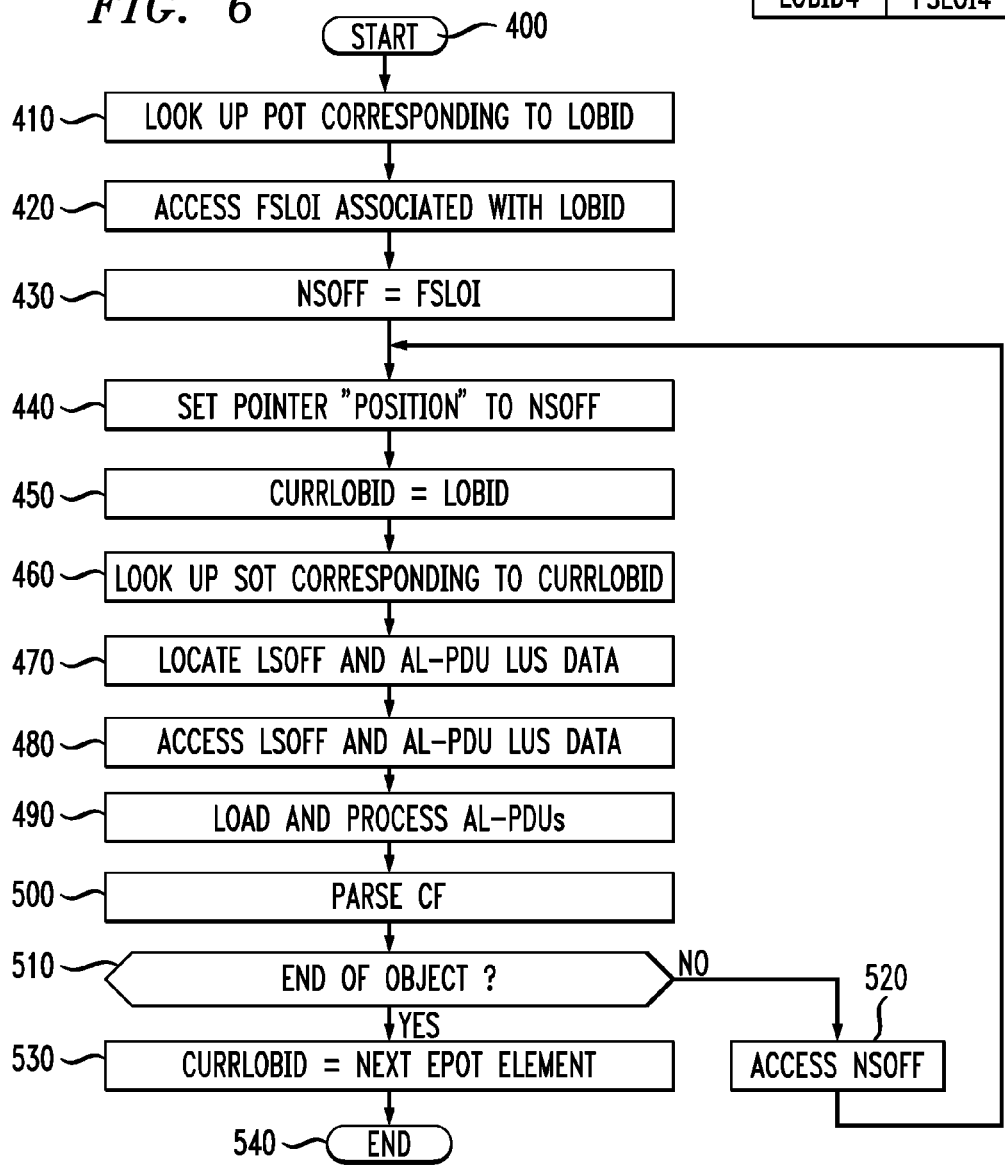

SYSTEM AND METHOD OF ORGANIZING DATA TO FACILITATE ACCESS AND STREAMING

RELATED APPLICATIONS

The present application is a continuation of parent application Ser. No. 10/785,905, filed Feb. 24, 2004, now U.S. Pat. No. 7,428,547, which is a continuation of Ser. No. 09/236,548, filed Jan. 26, 1999, now U.S. Pat. No. 6,751,623, which claims priority to U.S. Provisional Application Ser. No. 60/073,962 filed Jan. 26, 1998. The present application is also related to U.S. application Ser. No. 09/055,933, filed Apr. 7, 1998 now U.S. Pat. No. 6,079,566, and application Ser. No. 09/067,015, filed Apr. 28, 1998 now U.S. Pat. No. 6,292,805. The contents of each of these applications are incorporated herein by reference.

BACKGROUND OF THE INVENTION

1. Field of Invention

The invention relates to information processing, and more particularly to advanced storage and retrieval of audiovisual data objects according to the MPEG-4 standard, including utilization of an expanded physical object table including a list of local object identifiers.

2. Description of Related Art

In the wake of rapidly increasing demand for network, multimedia, database and other digital capacity, many multimedia coding and storage schemes have evolved. Graphics files have long been encoded and stored in commonly available file formats such as TIF, GIF, JPG and others, as has motion video in Cinepak, Indeo, MPEG-1 and MPEG-2, and other file formats. Audio files have been encoded and stored in RealAudio, WAV, MIDI and other file formats. These standard technologies have advantages for certain applications, but with the advent of large networks including the Internet the requirements for efficient coding, storage and transmission of audiovisual (AV) information have only increased.

Motion video in particular often taxes available Internet and other system bandwidth when running under conventional coding techniques, yielding choppy video output having frame drops and other artifacts. This is in part because those techniques rely upon the frame-by-frame encoding of entire monolithic scenes, which results in many megabits-per-second data streams representing those frames. This makes it harder to reach the goal of delivering video or audio content in real-time or streaming form, and to allow editing of the resulting audiovisual scenes.

In contrast with data streams communicated across a network, content made available in random access mass storage facilities (such as AV files stored on local hard drives) provide additional functionality and sometimes increased speed, but still face increasing needs for capacity. In particular, taking advantage of the random access characteristics of the physical storage medium, it is possible to allow direct access to, and editing of, arbitrary points within a graphical scene description or other audiovisual object information. Besides random access for direct playback purposes, such functionality is useful in editing operations in which one wishes to extract, modify, reinsert or otherwise process a particular elementary stream from a file.

In conjunction with the development of MPEG-4 coding and storage techniques, it is desirable to provide an improved ability to perform random access of audiovisual objects within video sequences. The opportunity to streamline random access would highlight and strengthen the potential of advanced capabilities provided by MPEG-4, and relieve the demands that those capabilities may impose on resources.

Part of the approach underlying MPEG-4 formatting is that a video sequence consists of a sequence of related scenes separated in time. Each picture is comprised of a set of audio-visual objects that may undergo a series of changes such as translations, rotations, scaling, brightness in color variations, etc., from one scene to the next. New objects can enter a scene and existing objects can depart, leaving certain objects present only in certain pictures. When scene changes occur, the entire scene and all the objects comprising the picture may be reorganized or initialized.

One of the identified functionalities of MPEG-4 is improved temporal random access, with the ability to efficiently perform random access of data within an audiovisual sequence in a limited time, and with fine resolution parts (e.g., frames or objects). Improved temporal random access techniques compatible with MPEG-4 involve content-based interactivity requiring not only the ability to perform conventional random access, accessing individual pictures, but also the ability to access regions or objects within a scene.

While the MPEG-4 file format described in the incorporated application Ser. No. 09/055,933 realizes such advantages, that approach includes at least two disadvantages prompted in part on that file format's reliance on a standard physical object table (POT) and segment object table (SOT) structure.

A fundamental limitation in the exchange of audio-visual information today is that its representation is extremely low level. Conventionally, audio-visual information is currently composed of coded video or audio samples, often organized into blocks, arranged in a commercial format. In contrast, in the future, multimedia will require flexible formats to allow a quick adaptation of the audio-visual information to various requirements in terms of access, bandwidth scalability, streaming, as well as general data reorganization.

SUMMARY OF THE INVENTION

The data structures, file formats, systems and methods of this invention provide enhanced audiovisual coding and storage techniques, related to MPEG-4, by introducing enhanced formatting including an expanded physical object table which utilizes an "ordered" list of unique identifiers for a particular object for every object instance. Therefore, using the invention, two object instances of the same object in the same segment can be separately identified. Thus, among other advantages, different instances of the identical object may be differentiated from one another.

The term "ordered" herein denotes that all access layer data (AL PDUs) of the same object instance are placed in the file in their natural order of occurrence, or coding order.

An additional benefit of the invention is that a given object instance can change its local identifier in time and still be randomly accessed by means of an improved physical object table/segment object table (POT)/(SOT) mechanism.

The invention in one aspect relates to a method of composing data in a file, and a medium for storing that file, the file including a file header containing physical object information and logical object information, and generating a sequence of audiovisual segments, each including a plurality of audiovisual objects. The physical object information contains pointers to access the audiovisual segments.

In another aspect the invention provides a corresponding method of extracting data from a file, including by accessing a file having a header which contains physical object information and logical object information, and accessing audiovisual segments contained therein.

In another aspect the invention provides a system for processing a data file including a processor unit and a storage unit connected to the processor unit, the storage unit storing a file including a file header and a sequence of audiovisual segments. The file header contains physical object information and logical object information, and the physical object information contains pointers to access the audiovisual segments.

This invention proposes a framework that integrates advanced concepts such as objects based audio-visual representation, meta-data and object oriented programming to achieve a flexible and generic representation of the audiovisual information and the associated methods to operate on it.

A multimedia file to be streamed over a given packet network should be quickly ready for streaming. Additionally, once transferred to the user terminal, multimedia file should allow easy editing and manipulation. This needs to be extended to the interchange of the audiovisual information among different systems and terminals, bridging the huge gap that exists between the way in which the user thinks about the multimedia and the way the current tools operate on it. By using an object based framework and meta-data information, the data structures, file formats, systems and methods of this invention provide the actual structure of the content to survive the process of acquisition, editing and distribution.

Meta-data is critical to allow further editing, indexing and searching as well as streaming over a given network support. It is essential to reach the required level of flexibility that it includes object relationships.

The data structures, file formats, systems and methods of this invention provide a conceptual framework for Intermedia format development in MPEG-4 called Flexible-Integrated Intermedia Format (Flexible-IIF or F-IIF). The Flexible-Integrated Intermedia Format (Flexible-IIF or F-IIF) is an advanced extension to the Integrated Intermedia Format (IIF) disclosed in the incorporated application Ser. No. 09/067,015 and set forth below in FIGS. 1-12. The Flexible-Integrated Intermedia Format (Flexible-IIF or F-IIF) can be visualized as a natural umbrella and unification tool for other Intermedia formats proposed in MPEG-4 and possibly a basis of the forthcoming MPEG-7.

Some of the current characteristics of the Flexible-Integrated Intermedia Format (Flexible-IIF or F-IIF) include enhanced flexibility, easy reprogrammability, versatile support for user and local terminal interaction, support for "packaged formats," and extension to the MPEG-4 Intermedia requirements specified in the incorporated 015 application. The Flexible-Integrated Intermedia Format (Flexible-IIF or F-IIF) is a very flexible and extensible meta-data representation and manipulation tool similarly to what is done in the context of computer music in the Xlisp based Stella, which is discussed in "http://ccrmawww.stanford.edu/CCRMA/Software/cm/tutorials/stella/toc.html" and Common Music and Common Lisp Music, which is discussed at "http://ccrmaww.stanford.edu/CCRMA/Software/clm/clm.html".

These and other features and advantages of this invention are described in or are apparent from the following detailed description of the data structures, file formats, systems and methods according to this invention.

BRIEF DESCRIPTION OF THE DRAWINGS

Various exemplary embodiments of this invention will be described in detail, with reference to the following figures, wherein:

FIG. 5 illustrates the format of a second exemplary embodiment of a physical object table of the invention;

FIG. 6 is a flowchart outlining one exemplary method for accessing data stored using the second exemplary embodiment of the physical object table of the invention;

DETAILED DESCRIPTION OF PREFERRED EMBODIMENTS

Figure 1:
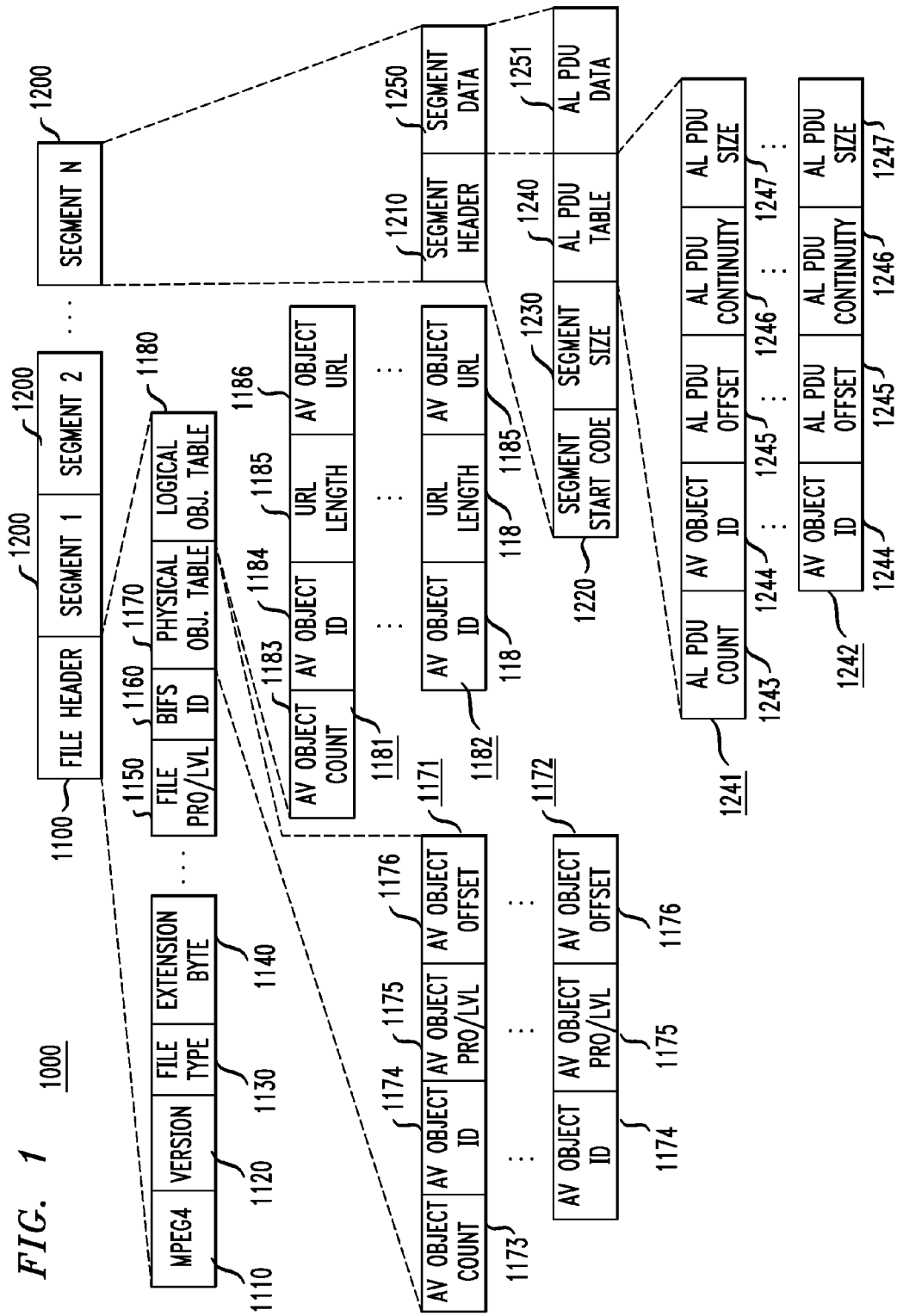
FIG. 1 illustrates a first exemplary embodiment of a file format structure for stored files according to the invention.

The MPEG-4 standard is an ISO/IEC standard which is building on the proven success of three fields: digital television, interactive graphics applications, i.e., synthetic content, and the World Wide Web, which provides distribution of, and access to, content. The MPEG-4 standard will provide the standardized technological framework enabling the integration of the production, distribution and content access paradigms of the three fields. The MPEG-4 standard defines tools with which to represent individual audiovisual objects, both natural and synthetic, ranging from arbitrarily shaped natural video objects to sprites and face and body animations. These objects are encoded separately into their own elementary streams.

In addition, scene description information is provided separately, defining the spatio-temporal location of these objects in the final scene to be presented to the user. This also includes support for user interaction. The scene description uses a tree-based structure, following the Virtual Reality Modeling Language (VRML) design. In contrast to VRML, scene descriptions can be dynamically updated. Object descriptors are used to associate scene description components that relate to digital video and audio to the actual elementary streams that contain the corresponding coded data. All these components are encoded separately, and transmitted to the receiver. The receiving terminal then has the responsibility of composing the individual objects together for presentation, and also managing user interaction.

The data structures, file formats, systems and methods of this invention will be described in terms of the MPEG-4 file format. Files formatted using the MPEG-4 file format are typically assigned an ".mp4" file extension to identify such files as MPEG-4-formatted files. In general, a session processes or presents an audio-visual scene. Typically, all audio-visual objects that are related to a particular session and that conform to the MPEG-4 standard will reside in one or more MPEG-4-formatted files. A session does not need to be contained in only one MPEG-4-formatted file under MPEG-4. Rather, a set of MPEG-4-formatted files can be used to provide a complete session, with one of the set of MPEG-4-formatted files acting as a master file. Other objects, which are referred to as "logical objects" or "remote objects", can be referenced by the master file, or any other file of a session, using universal resource locator (URL) calls. These logical or remote objects can be stored in a different locally-available file, such as a file stored on a hard disk, a CD-ROM disk or a floppy disk located at the same client or host computer as the session files. Alternatively, these logical or remote objects can be stored in a remotely stored file, such as a file accessed over a distributed network, such as a local area network, a wide area network, an intranet, the Internet, or any other known or later developed distributed network.

The MPEG-4 standard uses an object-based approach. Individual components of a scene are coded as independent objects, such as, for example, arbitrarily-shaped visual objects or separately coded sounds. The audio-visual objects are transmitted to a receiving terminal along with scene description information. The scene description information defines how the audio-visual objects should be positioned in space and time to construct the scene to be presented to a user. The scene description information is organized using a tree structure. The MPEG-4 tree structure is similar to the tree structure of the Virtual Reality Modeling Language (VRML). The encoding of the scene description information is more fully defined in Part 1 of the official ISO MPEG-4 specification (MPEG-4 Systems). Binary Format of Scene (BIFS) information is transmitted in its own elementary stream, with its own time and clock stamp information to ensure proper coordination of events at a receiving terminal.

Because the MPEG-4 standard is an object-based standard, several elementary streams may be associated with a particular program, i.e., an audio-visual presentation. Each elementary stream is formed by a number of "access units" (AUs). An access unit can correspond, for example, to a frame of video or to a small set of samples in an audio stream. In general, access units are assumed to be distinct presentation units. In order to provide a uniform way of describing important information, such as, for example, clock references, time stamps, whether a particular access unit is a random access point and the like, about the access units carried in each elementary stream, an "adaptation layer" is used to encapsulate all access units. The adaptation layer is a simple, and configurable, header structure that allows access to the important information about the access units without having to parsing the actual underlying encoded media data.

The Integrated Intermedia Format (IIF), which is described below with respect to FIGS. 1-12, is one of the proposals for the MPEG-4 media format specification. The Integrated Intermedia Format (IIF) is a solution that is designed specifically for MPEG-4. The Integrated Intermedia Format (IIF) allows efficient streaming of a file even in highly demanding environments such as media servers, or, at the user's choice, introduces various types of access of data objects in the file. Random access as well as sequential segment-based data access to objects is supported in the Integrated Intermedia Format (IIF). Extensions to allow streaming without prior processing of the data, referred to herein as "direct streaming", are also supported in the Integrated Intermedia Format (IIF). Integrated Intermedia Format (IIF)-formatted files intended for streaming applications can be stored with minimum overhead, while The Integrated Intermedia Format (IIF)-formatted files intended for random access or storage can provide additional functionality.

The Integrated Intermedia Format (IIF) has two parts: a core and an extension. The core includes tools to index and access objects. The core is discussed below with respect to FIGS. 1-12 and, in various forms, in the incorporated 933 and 015 applications. The extension includes tools to flexibly organize media using meta-data. The extension is discussed below with respect to FIGS. 13-15.

FIG. 1 shows a first exemplary embodiment of the data structures and file formats according to this invention, usable when the audio-visual objects are displayed from stored files. As shown in FIG. 1, an MPEG-4-formatted file 1000 includes a file header 1100 and an arbitrary number of segments 1200. The file header 1100 contains the global information about the audio-visual objects contained within the MPEG-4-formatted file 1000. The segments 1200 contain the audio-visual objects. The audio-visual objects represent textual, graphical, video, audio or other information.

As shown in FIG. 1, the file header 1100 includes an "MPEG4" field 1110, a version field 1120, a file type description field 1130, an extension indicator field 1140, which is optionally followed by zero or more extension bytes, a profile/level field 1150, a BIFS ID field 1160, a physical object table 1170 and a logical objects table 1180. The "MPEG4" field 1110 is a five-byte field that contains the characters "M" "P" "E" "G" and "4". The version field 1120 indicates the version number of the file format.

The file type description field 1130 contains the file type definition data. The file type definition data stored in the file type description field 1130 describes the contents of the file. Table 1 shows the bit assignments for bits 0-7 of the file type description field 1130.

TABLE 1

Bit Assignments for the File Type Description Field for a Stored File Implementation

| BIT | HIGH (1) | LOW (0) |
| --- | --- | --- |
| 0 | Stored File | Streaming File |
| 1 | Physical Objects Present | No Physical Objects Present |
| 2 | Logical Objects Present | No Logical Objects Present |
| 3 | Random Access Enabled | Random Access Disabled. |
| 4 | Reserved | Reserved |
| 5 | Reserved | Reserved |
| 6 | Reserved | Reserved |
| 7 | Reserved | Reserved |

In particular, bit 0 indicates whether the MPEG-4 session defined by this file is a stored file session or a streaming file session. Bit 1 indicates whether or not there are any physical audio-visual objects present in the file. Similarly, bit 2 indicates whether or not there are any logical audio-visual objects present in the stream to be accessed using URL calls to remote MPEG-4 files. It should be appreciated that bit 2 is always set to 0 in a streaming file. Bit 3 indicates whether or not, for a streaming file, one access layer data unit (AL PDU), described in greater detail below, is contained in one transport protocol data unit (TPDU), described in greater detail below.

In such cases, access to random objects is possible by accessing the transport protocol data units. Accordingly, bit 3 called the random access flag. It should be appreciated that bit 3 is always set to zero for a stored file. The operation when bit 3 is set will be described in greater detail with respect to FIG. 2. Bits 4-7 are currently reserved for future use.

The is extension indicator field 1140 is a 1 byte extension indicator that indicates whether or not it is followed by one or more extension data bytes, and if so, how many extension data bytes follow the extension indicator field 1140. The profile/level field 1150 is a 1 byte field describing the profile and/or level of the file. This allows a decoder to determine if that decoder is capable of handling the data in the file. The BIFS ID field 1160 is a 2-byte field that identifies the binary format of scene (BIFS) protocol data units in the file and includes the corresponding object IDs. These object IDs are used to uniquely identify the audio-visual objects encapsulated in the access layer data units (AL PDUs), including the binary format of scene (BIFS) data.

The physical object table 1170 includes a description of all the objects that are physically present or contained in the file. In contrast, the logical object table 1180 indicates the location of all file objects that are not physically present in the file, but are instead logically included in the file by reference through one or more universal resource locators (URLs) to other MPEG-4 compliant files. As indicated above, these other MPEG-4 compliant files are remotely located on a distributed network, such as the Internet. Thus, it should be appreciated that if there are no logically referenced audio-visual objects in the MPEG-4 file 1000, the logical object table 1180 can be omitted. Similarly, if there are no physically present audio-visual objects in the MPEG-4 file 1000, i.e., there are only logically referenced audio-visual objects in the MPEG-4 file 1000, the physical object table 1170 can be omitted.

As shown in FIG. 1, the physical object table 1170 includes a first audio-visual object description entry 1171 for a first audio-visual object described in the MPEG-4 file 1000, and zero, one or more second audio-visual object description entries 1172 for each additional audio-visual object described in the MPEG-4 file 1000. The first audio-visual object description entry 1171 of the physical object table 1170 includes a 2-byte audio-visual object count (AV OBJECT COUNT) field 1173, a 2-byte audio-visual object ID (AV OBJECT ID) field 1174, a 1-byte profile/level (AV OBJECT PRO/LVL) field 1175, and an 8-byte audio-visual object offset (AV OBJECT OFFSET) field 1176. Each second audio-visual object description entry 1172 includes the audio-visual object ID (AV OBJECT ID) field 1174, the profile/level (AV OBJECT PRO/LVL) field 1175, and the audio-visual object offset (AV OBJECT OFFSET) field 1176, but does not include the audio-visual object count (AV OBJECT COUNT) field 1173.

The audio-visual object count (AV OBJECT COUNT) field 1173 indicates the number of audio-visual objects, including BIFS objects, that are part of the session defined at least in part by the MPEG-4 file 1000 and that are physically present in the MPEG-4 file 1000. The audio-visual object ID (AV OBJECT ID) field 1174 indicates the audio-visual object ID assigned to the audio-visual or BIFS object being defined by this entry in the physical object table 1170. The profile/level (AV OBJECT PRO/LVL) field 1175 contains a profile/level description for the audio-visual or BIFS object being defined by this entry in the physical object table 1170. The audio-visual object offset (AV OBJECT OFFSET) field 1176 indicates the offset, from the beginning of the MPEG-4 file 1000 to the segment 1200 in which the audio-visual object or the BIFS information being defined by this entry in the physical object table 1170 first occurs in the MPEG-4 file 1000.

When the logical object table 1180 is present in the MPEG-4 file 1000, the logical object table 1180 includes a first audio-visual object description entry 1181 for a first audio-visual object described in the MPEG-4 file 1000, and zero, one or more second audio-visual object description entries 1182 for each additional audio-visual object described in the MPEG-4 file 1000. The first audio-visual object description entry 1181 of the logical object table 1180 includes a 2-byte audio-visual object count (AV OBJECT COUNT) field 1183, a 2-byte audio-visual object ID (AV OBJECT ID) field 1184, a 1-byte uniform resource locator length (URL LENGTH) field 1185, and an audio-visual object uniform resource locator (AV OBJECT URL) field 1186. Each second audio-visual object description entry 1182 includes the audio-visual object ID (AV OBJECT ID) field 1184, the uniform resource locator length (URL LENGTH) field 1185, and the audio-visual object uniform resource locator (AV OBJECT URL) field 1186, but does not include the audio-visual object count (AV OBJECT COUNT) field 1183.

The audio-visual object count (AV OBJECT COUNT) field 1183 indicates the number of audio-visual objects that are part of the session defined at least in part by the MPEG-4 file 1000, but that are not physically present in the MPEG-4 file 1000. The audio-visual object ID (AV OBJECT ID) field 1184 indicates the audio-visual object ID assigned to the audio-visual object being referenced by this entry in the logical object table 1180. The audio-visual object ID (AV OBJECT ID) field 1184 of the logical object table 1180 is also known as the elementary stream ID data, which is described below in greater detail. The uniform resource locator length (URL LENGTH) field 1185 indicates the length in bytes of the universal resource locator (URL) defined in the audio-visual object uniform resource locator (AV OBJECT URL) field 1186 of this entry in the logical object table 1180.

The audio-visual object uniform resource locator (AV OBJECT URL) field 1186 is an alphanumeric string indicating the location on the distributed network of a file storing the audio-visual object being referenced by this entry in the logical object table 1180. The universal resource locators (URLs) in the audio-visual object uniform resource locator (AV OBJECT URL) fields 1186 are coded as strings, without a terminating null "\0" character. The file pointed to by the uniform resource locator set forth in the audio-visual object uniform resource locator (AV OBJECT URL) field 1186 must also be in the MPEG-4 file format of this invention. It should be appreciated that it is up to the creator of that file to ensure that the audio-visual object ID set forth in the audio-visual object ID (AV OBJECT ID) field 1184 exists in the remote file indicated by uniform resource locator set forth in the audio-visual object uniform resource locator (AV OBJECT URL) field 1186 and is not otherwise duplicated in the MPEG-4 file 1000. The incorporation of logical objects in the data structures, file formats, systems and method of this invention facilitates the use of a set of distributed files to store an assembled MPEG-4 presentation.

As indicated above, the MPEG-4 file 1000 comprises one or more file segments 1200. Each file segment 1200 is uniquely identified by a 32-bit start code (0x000001B9). A special code, "0x000001FF", denotes the end of the file.

As shown in FIG. 1, each file segment 1200 includes a segment header 1210 and at least one segment data portion 1250. Each segment header 1210 includes a segment start code (SEGMENT START CODE) field 1220, a segment size (SEGMENT SIZE) field 1230, and an access layer data unit (AL PDU) table 1240. A 4-byte segment size field follows the access layer data unit (AL PDU) table 1240. The 4-byte segment size field indicates the number of bytes until the beginning of the next segment start code or end-of-data code. Each segment data portion 1250 includes one or more access layer data units (AL PDUs) 1251. It should be appreciated that the access layer data units (AL PDUs) 1251 are also known as synchronization layer fragments (SL-Fragments) in the art, and that this term is beginning to replace the term "access layer data unit" for the access layer data units (AL PDUs) 1251.

The segment start code (SEGMENT START CODE) field 1220 for a particular segment 1200 contains the unique 32-bit start code for that segment 1200. The segment size (SEGMENT SIZE) field 1230 indicates the length in bytes of that segment 1200. The access layer data unit (AL PDU) table 1240 contains a first access layer data unit (AL PDU) entry 1241 for a first access layer data unit (AL PDU) of the current segment 1200, and zero, one or more second access layer data unit (AL PDU) entries 1242 for each additional access layer data unit (AL PDU) of the current segment 1200. For each access layer data unit (AL PDU) 1251, the corresponding access layer data unit (AL PDU) entry 1241 or 1242 includes an 8-byte structure used to describe the object contained in that access layer data unit (AL PDU) 1251. Accordingly, the first access layer data unit (AL PDU) entry 1241 of the access layer data unit (AL PDU) table 1240 includes a 2-byte audio-visual object ID (AV OBJECT ID) field 1244, a 4-byte access layer data unit offset (AL PDU OFFSET) field 1245, a 2-bit access layer data unit continuity (AL PDU CONTINUITY) field 1246, and a 14-bit access layer data unit size (AL PDU SIZE) field 1247. The first access layer data unit (AL PDU) entry 1241 of the access layer data unit (AL PDU) table 1240 also includes a 2-byte access layer data unit count (AL PDU COUNT) field 1243. Each second access layer data unit (AL PDU) entry 1242 includes the audio-visual object ID (AV OBJECT ID) field 1244, the access layer data unit offset (AL PDU OFFSET) field 1245, the access layer data unit continuity (AL PDU CONTINUITY) field 1246, and the access layer data unit size (AL PDU SIZE) field 1247, but not the access layer data unit count (AL PDU COUNT) field 1243.

The access layer data unit count (AL PDU COUNT) field 1243 indicates how many access layer data units (AL PDUs) 1251 are contained in the corresponding file segment 1200. The audio-visual object ID (AV OBJECT ID) field 1244 indicates the audio-visual object ID assigned to the audio-visual or BIFS object stored in the corresponding access layer data unit (AL PDU) 1251. The access layer data unit offset (AL PDU OFFSET) field 1245 indicates the offset from the start of the segment 1200 to the starting point of the corresponding access layer data unit (AL PDU) 1251. The access layer data unit continuity (AL PDU CONTINUITY) field 1246 is a "continuity flag". The access layer data unit size (AL PDU SIZE) field 1247 indicates the size, in bytes, of the corresponding access layer data unit (AL PDU) 1251.

Table 2 shows the bit value assignments for the two bits of the access layer data unit continuity (AL PDU CONTINUITY) field 1246.

TABLE 2

Bit Assignments For The File Type Description Field

| BIT 1 | BIT 2 | TYPE OF ADAPTATION LAYER PROTOCOL DATA UNIT |
|---|---|---|
| 0 | 0 | Complete PDU |
| 0 | 1 | First Segment of a Split PDU |

TABLE 2-continued

Bit Assignments For The File Type Description Field

| BIT 1 | BIT 2 | TYPE OF ADAPTATION LAYER PROTOCOL DATA UNIT |
|---|---|---|
| 1 | 0 | Last Segment of a Split PDU |
| 1 | 1 | Intermediate Segment of a Split PDU |

Thus, when the continuity flag bits are "00", the corresponding access layer data unit (AL PDU) 1251 is a complete access layer data unit (AL PDU). When the continuity flag bits are "01", the corresponding access layer data unit (AL PDU) 1251 is the first segment of a split access layer data unit (AL PDU), i.e., an access layer data unit (AL PDU) that is continued in a following segment 1200. When the continuity flag bits are "10", the corresponding access layer data unit (AL PDU) 1251 is the last segment of a split access layer data unit (AL PDU) i.e., an access layer data unit (AL PDU) that is continued from a previous segment 1200. When the continuity flag bits are "11", the corresponding access layer data unit (AL PDU) 1251 is an intermediate segment of a split access layer data unit (AL PDU) i.e., an access layer data unit (AL PDU) that is continued from a previous segment 1200 and that is continued in a following segment 1200. The next portion of a first or intermediate split access layer data unit (AL PDU) 1251 is located by looking in the access layer data unit (AL PDU) table 1240.

As shown in FIG. 1, when the MPEG-4 file 1000 is a stored-file type MPEG-4 file, the access layer data units (AL PDUs) 1251 are interspersed within the segments 1200. Each segment 1200 contains a header 1210 describing the access layer data units (AL PDUs) 1251 located within that segment 1200. The MPEG-4 file 1000 thus contains a set of access layer data units (AL PDUs) 1251 multiplexed and indexed such that random access of individual objects, which are encapsulated in the access layer data units (AL PDUs) 1251, is possible at a level of abstraction higher than the physical storage medium that the objects are stored in. This decoupling of audio-visual objects from the physical storage allows highly flexible and general manipulation of these data types.

The stored-filed format of the first exemplary embodiment of the data structures and file format according to this invention for MPEG-4 files supports random accessing of audio-visual objects from local media. To access an audio-visual object at random by object number, the access layer data unit (AL PDU) table 1240 of a current segment 1200 is accessed to look up the audio-visual object ID (AV OBJECT ID) for that object. If the audio-visual object ID (AV OBJECT ID) for that object is found, the corresponding access layer data unit (AL PDU) 1251 of the current segment 1200 is retrieved.

Because an audio-visual object can span more than one access layer data unit (AL PDU) 1251, it is possible that the requested object is encapsulated in more than one access layer data unit (AL PDU) 1251. To retrieve all of the access layer data units (AL PDUs) 1251 that form the requested audio-visual object, all of the access layer data units (AL PDUs) 1251 corresponding to the requested audio-visual object ID (AV OBJECT ID) are examined and retrieved until an access layer data unit (AL PDU) 1251 is found whose corresponding entry in the corresponding access layer data unit (AL PDU) table 1240 has the two-bit access layer data unit continuity (AL PDU CONTINUITY) field set to "01". This indicates that the corresponding access layer data unit (AL PDU) 1251 is the first access layer data unit (AL PDU) 1251 of the audio-visual object.

If the audio-visual object's audio-visual object ID (AV OBJECT ID) is not found in the current segment, the access layer data unit (AL PDU) table 1240 in the next segment 1200 is examined. All access layer data units (AL PDUs) 1251 are listed in the access layer data unit (AL PDU) table 1240. This also allows more than one instance of a single audio-visual object with the same ID to be present in the same segment 1200. It is assumed that the access layer data units (AL PDUs) 1251 having the same audio-visual object ID (AV OBJECT ID) are placed in the MPEG-4 file 1000 in their natural time, or play-out, order.

Figure 2:
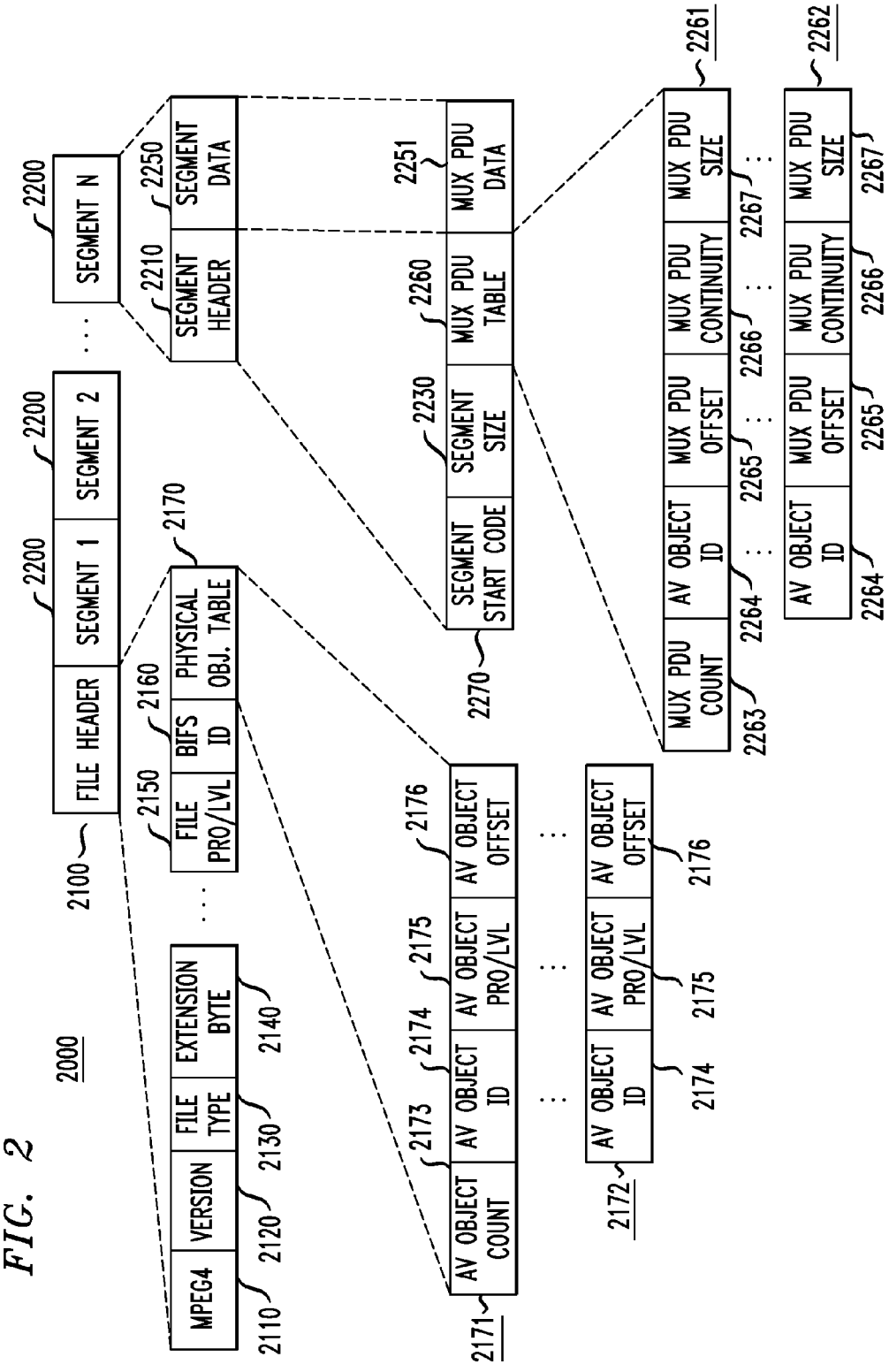
FIG. 2 illustrates a second exemplary embodiment of a file format structure for streamed files according to the invention.

FIG. 2 shows a second exemplary embodiment of the data structures and file formats according to this invention, usable when the audio-visual objects are displayed using streaming files. In a streaming implementation, the user views incoming audio-visual data portions as the incoming audio-visual data portions arrive over a connection to a distributed network on which the files are stored and from which the files are transmitted over the distributed network. The incoming audio-visual data portions may be temporarily stored in an electronic memory, such as RAM, CMOS memory, flash memory, disk memory or the like. However, the incoming audio-visual data is not necessarily assembled into a fixed file.

As shown in FIG. 2, as in the MPEG-4-formatted file 1000 shown in FIG. 1, an MPEG-4-formatted file 2000 includes a file header 2100 and an arbitrary number of segments 2200. The file header 2100 contains the global information about the audio-visual objects contained within the MPEG-4-formatted file 2000. The segments 2200 contain the audio-visual objects. The audio-visual objects represent textual, graphical, video, audio or other information.

In general, the file header 2100 and the segments 2200 substantially correspond to the file header 1100 and the segments 1200 shown in FIG. 1 and described above. However, to stream the content of an MPEG-4-formatted file for playback, such as from a server to a client over a distributed network, the index information, i.e., the physical object table 1170 and the logical object table 1180, is removed and access layer data units (AL PDUs) are prepared to be delivered over a channel.

Thus, in the file header 2100 of the MPEG-4 file 2000, the "MPEG4" field 2110, the version field 2120, the file type description field 2130, the extension indicator field 2140, which is optionally followed by zero or more extension bytes, the profile/level field 2150, the BIFS ID field 2160, and the physical object table 2170 are generally identical to the "MPEG4" field 1110, the version field 1120, the file type description field 1130, the extension indicator field 1140, which is optionally followed by zero or more extension bytes, the profile/level field 1150, the BIFS ID field 1160, and the physical object table 1170 shown in FIG. 1. However, in contrast to FIG. 1, the file header 2100 shown in FIG. 2 does not include a logical object table. This is because the logical object table 1180 is only necessary for a stored file implementation, and is not part of a streaming file implementation.

As in the physical object table 1170 described above with respect to FIG. 1, the physical object table 2170 shown in FIG. 2 includes a first audio-visual object description entry 2171 for a first audio-visual object described in the MPEG-4 file 2000, and zero, one or more second audio-visual object description entries 2172 for each additional audio-visual object described in the MPEG-4 file 2000. The first audio-visual object description entry 2171 of the physical object table 2170 includes a 2-byte audio-visual object count (AV OBJECT COUNT) field 2173, a 2-byte audio-visual object ID (AV OBJECT ID) field 2174, a 1-byte profile/level (AV OBJECT PRO/LVL) field 2175, and an 8-byte audio-visual object offset (AV OBJECT OFFSET) field 1176. Each second audio-visual object description entry 2172 includes the audio-visual object ID (AV OBJECT ID) field 2174, the profile/level (AV OBJECT PRO/LVL) field 2175, and the audio-visual object offset (AV OBJECT OFFSET) field 2176, but does not include the audio-visual object count (AV OBJECT COUNT) field 2173. Additionally, as indicated above with respect to the MPEG-4-formatted file 1000 shown in FIG. 1, the physical object table 2170 is optional. The physical object table 2170 is necessary only when local media access is to be performed, and when present it is contained in the file header 2100.

Similarly, in the segment 2200 of the MPEG-4 file 2000, the segment header 2210 and the at least one segment data portion 2250 are generally identical to the segment header 1210 and the at least one segment data portion 1250 shown in FIG. 1. Likewise, each segment header 2210 includes a segment start code (SEGMENT START CODE) field 2220 and a segment size (SEGMENT SIZE) field 2230 that are generally identical to the segment start code field 1220 and the segment size field 1230 shown in FIG. 1. However, in place of the access layer data unit (AL PDU) table 1240 shown in FIG. 1, the segment header 2210 includes a multiplexer protocol data unit (MUX PDU) table 1260. Similarly, in place of the access layer data unit (AL PDU) 1251 shown in FIG. 1, each segment data portion 2250 includes one or more multiplexer protocol data units (MUX PDUs) 1251. A 4-byte segment size field follows the multiplexer protocol data unit (MUX PDU) table 1260. The 4-byte segment size field indicates the number of bytes until the beginning of the next segment start code or end-of-data code.

The multiplexer protocol data unit (MUX PDU) table 2260 contains a first multiplexer protocol data unit (MUX PDU) entry 2261 for a first multiplexer protocol data unit (MUX PDU) of the current segment 2200, and zero, one or more second multiplexer protocol data unit (MUX PDU) entries 2262 for each additional multiplexer protocol data unit (MUX PDU) of the current segment 2200. For each multiplexer protocol data unit (MUX PDU) 2251, the corresponding multiplexer protocol data unit (MUX PDU) entry 2261 or 2262 includes an 8-byte structure used to describe the object contained in that multiplexer protocol data unit (MUX PDU) 2251. Accordingly, the first multiplexer protocol data unit (MUX PDU) entry 2261 of the multiplexer protocol data unit (MUX PDU) table 2260 includes a 2-byte audio-visual object ID (AV OBJECT ID) field 2264, a 4-byte multiplexer protocol data unit offset (MUX PDU OFFSET) field 2265, a 2-bit multiplexer protocol data unit continuity (MUX PDU CONTINUITY) field 2266, and a 14-bit multiplexer protocol data unit size (MUX PDU SIZE) field 2267. The first multiplexer protocol data unit (MUX PDU) entry 2261 of the multiplexer protocol data unit (MUX PDU) table 2260 also includes a 2-byte multiplexer protocol data unit count (MUX PDU COUNT) field 2263. Each second multiplexer protocol data unit (MUX PDU) entry 2262 includes the audio-visual object ID (AV OBJECT ID) field 2264, the multiplexer protocol data unit offset (MUX PDU OFFSET) field 2265, the multiplexer protocol data unit continuity (MUX PDU CONTINUITY) field 2266, and the multiplexer protocol data unit size (MUX PDU SIZE) field 2267, but not the multiplexer protocol data unit count (MUX PDU COUNT) field 2263.

The multiplexer protocol data unit (MUX PDU COUNT) field 2263 indicates how many multiplexer protocol data units (MUX PDUs) 2251 are contained in the corresponding file segment 2200. The audio-visual object ID (AV OBJECT ID) field 2264 indicates the audio-visual object ID assigned to the audio-visual or BIFS object stored in the corresponding multiplexer protocol data unit (MUX PDU) 2251. The multiplexer protocol data unit (MUX PDU OFFSET) field 2265 indicates the offset from the start of the segment 2200 to the starting point of the corresponding multiplexer protocol data unit (MUX PDU) 2251. The multiplexer protocol data unit (MUX PDU CONTINUITY) field 2266 is a "continuity flag". As indicated above, Table 2 outlines the bit assignments for the bit values of the multiplexer protocol data unit (MUX PDU CONTINUITY) field 2266. The multiplexer protocol data units (MUX PDU SIZE) field 2267 indicates the size, in bytes, of the corresponding multiplexer protocol data unit (MUX PDU) 2251.

As indicated above with respect to the file type description field 1130, bit 3 is set only in the streaming type MPEG-4 file 2000. When bit 3 is set, bit 3 indicates that the transport PDU contains data that belong to one multiplexer protocol data unit (MUX PDU) 2251. If the random access flag is set, the audio-visual object ID field 2174 in the physical object table 2170 indicates an elementary stream ID (ESID) of the audio-visual object contained in the multiplexer protocol data unit (MUX PDU) 1251, which is also referred to as a transport protocol data unit (TPDU). Otherwise, the audio-visual object ID field 2174 indicates the packet number in the current segment. This is because if the transport protocol data unit (TPDU) contains data for multiple audio-visual objects, i.e., that the bit 3 random access flag is not set, the transport protocol data unit (TPDU) cannot be directly used for random access and also cannot be associated with a single elementary stream ID (ESID).

Because the remaining elements of the file header 2100 and each segment 2200 are thus generally the same as the corresponding elements of the file header 1100 and each segment 1200, these elements will not be described in greater detail.

In the streaming environment under MPEG-4, previous versions of the MPEG standard, namely MPEG-1 and MPEG-2, provided an explicit definition of how individual elementary streams are to be multiplexed together for transmission as a single bitstream. Since the MPEG-4 standard is intended to be used in a variety of communication environments, ranging from Internet connections to native ATM, or even mobile communication environments, the MPEG-4 standard does mandate a particular structure or mechanism for multiplexing. Instead, the MPEG-4 standard assumes a generic model for a transport multiplexer, referred to as a TransMux. For transport facilities that do not conform to that model, such as, for example, data transmission using the GSM digital cellular telephony standard, the MPEG-4 standard provides the definition of a simple and flexible multiplexer, referred to as a FlexMux. Using the FlexMux flexible multiplexer, however, is entirely optional. The FlexMux flexible multiplexer provides a simple multiplexing facility by allowing elementary streams to populate channels within a FlexMux flexible multiplexer. The FlexMux flexible multiplexer also allows multiple media to share a FlexMux flexible multiplexer protocol data unit (FlexMux PDU), which is useful for low delay and/or low-bandwidth applications.

The streamed-filed format of the second exemplary embodiment of the data structures and file format according to this invention for MPEG-4 files supports random accessing of audio-visual objects from local media. Randomly accessing the MPEG-4 file 2000 generally corresponds to randomly accessing the MPEG-4 file 1000, except that, instead of accessing the access layer data unit (AL PDU) table 1240, the multiplexer protocol data unit (MUX PDU) table 2260 and its various fields are accessed.

It should be appreciated that data formatted according to the data structures, file formats, systems and methods of this invention, such as the audio-visual objects stored in the MPEG-4 files 1000 or 2000, may be delivered over a distributed network, such as the Internet, a cellular network for streaming data, or may be accessed from a local storage device for playback from mass storage. The additional headers added to facilitate random access typically must be removed before a file can be played back.

Figure 3:
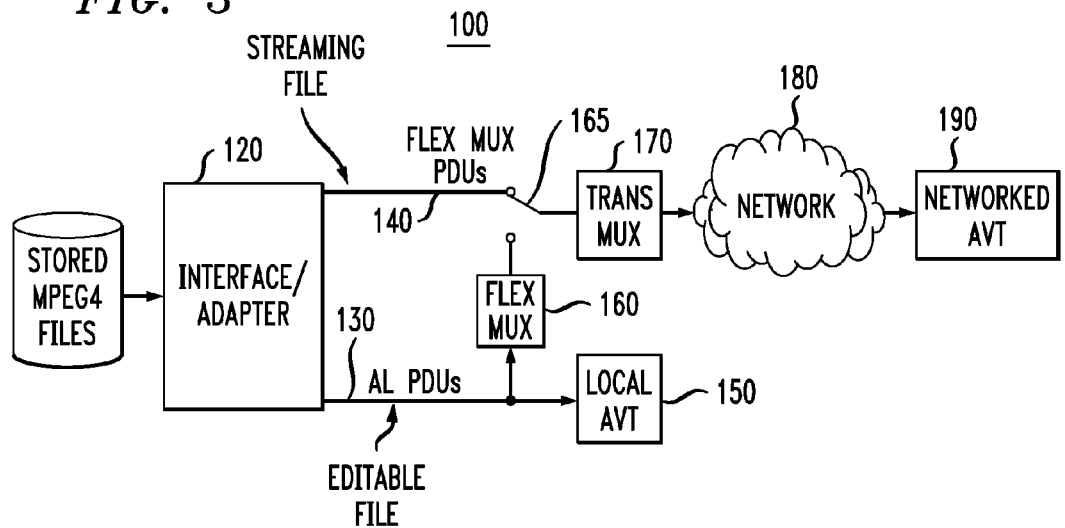
FIG. 3 illustrates an apparatus for transmitting audiovisual objects to audiovisual terminals according to the invention.

FIG. 3 illustrates a system 100 that processes the MPEG-4 files 1000 or 2000 for play back according to the data structures, file formats, systems and methods of this invention. As shown in FIG. 3, the MPEG-4 files 1000 and 2000 can be stored on any known or later developed data storage device 110, such as a hard disk and disk drive, a floppy disk and disk drive, a CD ROM and CD-ROM drive, flash memory, RAM or the like. The data storage device 110 is connected to a file format interface 120.

The file format interface 120 is connected to an editable file channel 130 and a streaming file channel 140. The file format interface 120 is connected by the editable file channel 130 to a local audio-visual terminal (LOCAL AVT) 150 and a FlexMux flexible multiplexer (FLEX MUX) 160. The file format interface 120 is connectable over the streaming file channel 140 and a switch 165 to a transport multiplexer (TRANS MUX) 170. The file format interface 120 communicates access layer data units (AL PDUs) over the editable file channel 130 to the local audio-visual terminal (LOCAL AVT) 150 and the FlexMux flexible multiplexer (FLEX MUX) 160. The file format interface 120 communicates FlexMux flexible multiplexer protocol data units (FLEX MUX PDUs) to the transport multiplexer (TRANS MUX) 170 over the streaming file channel 140 when the switch 165 is connected to the streaming file channel 140. Additionally, the FlexMux flexible multiplexer (FLEX MUX) 160 is connectable by the switch 165 to the transport multiplexer (TRANS MUX) 170 to communicate access layer data units (AL PDUs) to the transport multiplexer (TRANS MUX) 170.

The transport multiplexer (TRANS MUX) 170 is connected to a data communications network 180. The data communications network 180 is connected to an audio-visual terminal 190. The audio-visual terminal 190 receives the audio-visual data from the data communications network 180. The system 100 can therefore operate on streamed or mass-stored audio-visual data at the networked audio-visual terminal 190, or operate on mass-stored audio-visual data at the local audio-visual terminal 150.

The data structures, file formats, systems and methods of this invention illustratively use a file format specified as limited to 64K local objects and 64K remote objects. Furthermore, the size of the segments 1200 and 2200 is limited to 4 GB. The offsets to individual objects in the physical and logical object tables 1170, 1180 and 2170 limit the total size of the data structures and file formats to a 64-bit address space.

Figure 4:
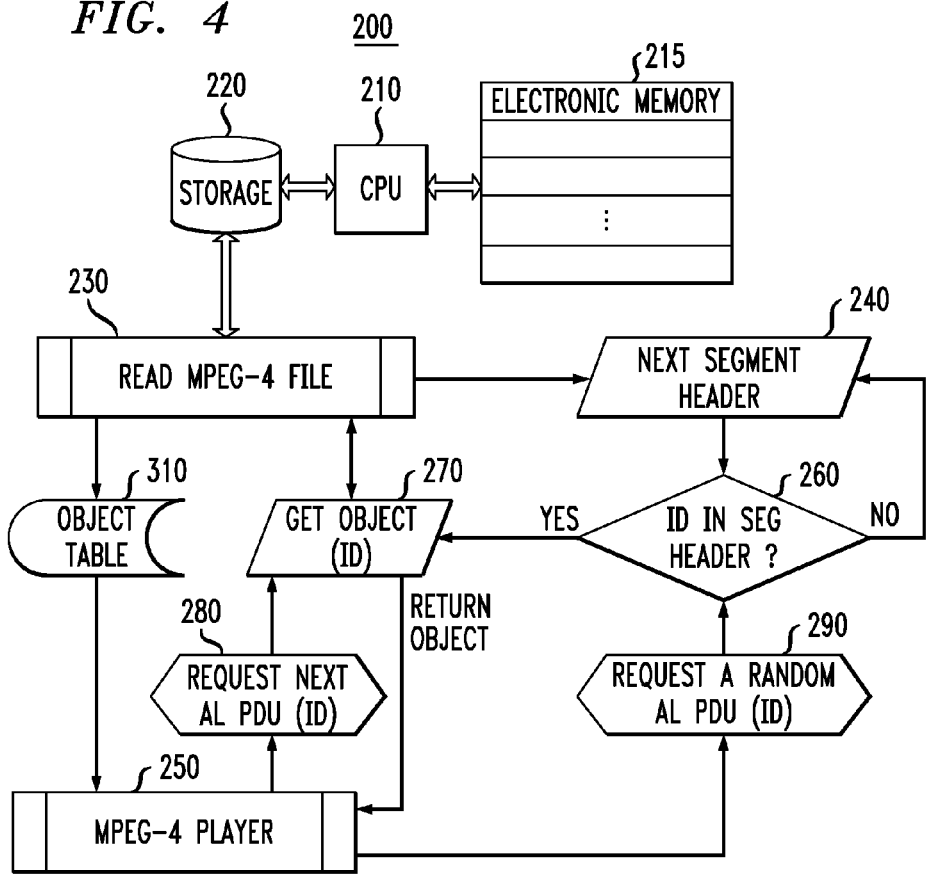
FIG. 4 illustrates an apparatus for extracting audiovisual data stored and accessed according to the invention.

FIG. 4 is a flow diagram outlining another exemplary embodiment of a system 200 that processes the MPEG-4 files 1000 or 2000 for play back according to the data structures, file formats, systems and methods of this invention. In FIG. 4, the system 200 uses the data structures and file formats according to this invention to access audio-visual objects from the MPEG-4 files 1000 or 2000 according to this invention. As shown in FIG. 4, the system 200 includes a controller 210, an associated electronic memory device 215 and a storage device 220. The system further includes a read module 230, a next segment header read module 240, an MPEG-4 player 250, an ID check module 260, a Get Object ID module 270, a next request module 280 and a random request module 290. As shown in FIG. 4, the other components are depicted logically, and may correspond to software or hardware modules according to design needs, and in which blocks could be combined, as will also be appreciated by persons skilled in the art. For example, the MPEG-4 player 260 may comprise a video buffer, screen, audio channels and related output devices.

The controller 210 requests one or more random audio-visual objects by specifying the audio visual object ID (AV OBJECT ID), such as the elementary stream ID (ESID). In particular, the controller 210 accesses the storage device 220 to cause the read module 230 to perform a read operation on an MPEG-4 file 300 stored in the storage device 220. The MPEG-4 file 300 includes an object table 310. Then the controller causes the next segment header read module 240 to read a next segment header of the MPEG-4 file stored in the storage device 220. The read module 230 accesses the object table 310 for translation purposes, and communicates extracted audio-visual data to the MPEG-4 player 250. The ID check module 260 checks for an ID in the segment header. If the ID check module 260 finds the ID, the ID check module 260 transmits the extracted ID to the Get Object ID module 270. If the ID check module 260 does not find the ID, control returns to the next segment header read module 240. After the MPEG-4 player 250 has finished presenting the current audio-visual data, it transmits a request through the next request module 280 for the next AL PDU (ID), or may request a random AL PDU (ID) through the random request module 290, which in turn communicates that information to the ID check module 260.

As noted above, the way in which audio-visual objects are accessed from a file depends on the intended application and hence the way the client applications are designed. One significant purpose of the data structures, file formats systems and methods of this invention is to provide underlying universal support for easy access of individual audio-visual objects from any storage device. Of course, any client application employing the data structures, file formats systems and methods of this invention must have a module that retrieves audio-visual objects from a file. The functionality of this front-end component includes retrieving audio-visual objects by their elementary stream ID (ESID), retrieving the composition information, and retrieving the $n^{th}$ occurrence of an object in the elementary stream. The module will parse the segment headers for the presence of an object in that segment. If the object is not present in the segment, the module scans the next segment. This is repeated until the desired object is found or the end of the file marker is reached.

The data structures, file formats, systems and methods of this invention provide a second exemplary embodiment of the physical object tables (POTs) 1170 and 2170 shown in FIGS. 1 and 2. This second exemplary embodiment of the physical object tables (POTs) 1170 and 2170 alters the physical object table structure of the physical object tables (POTs) 1170 and 2170 to provide an expanded physical object table (EPOT) 3170. As indicated above with respect to the physical object table 1170, the expanded physical object table (EPOT) 3170 includes a description of all the objects that are physically present or contained in the file.

As shown in FIG. 5, the expanded physical object table (EPOT) 3170 includes a first audio-visual object description entry 3171 for a first audio-visual object described in the MPEG-4 file 1000 or 2000, and zero, one or more second audio-visual object description entries 3172 for each additional audio-visual object described in the MPEG-4 file 1000 or 2000. The first audio-visual object description entry 3171 of the physical object table (EPOT) 3170 includes an audio-visual object count (COUNT) field 3173, one or more local audio-visual object ID (LOBID) fields 3174, an audio-visual object profile/level (OPL) field 3175, a different audio-visual object instances count (ICOUNT) field 3177, and one or more first segment of logical audio-visual object instance (FSLOI) fields 3176. Each second audio-visual object description entry 3172 includes one or more local audio-visual object ID (LOBID) fields 3174, the audio-visual object profile/level (OPL) field 3175, the different audio-visual object instances count (ICOUNT) field 3177, and one or more first segment of logical audio-visual object instance (FSLOI) fields 3176, but does not include the audio-visual object count (COUNT) field 3173.

It should be appreciated that the audio-visual object count (COUNT) field 3173, the local audio-visual object ID (LOBID) fields 3174 and the audio-visual object profile/level (OPL) field 3175 generally correspond to the audio-visual object count (AV OBJECT COUNT) fields 1173 and 2173, the audio-visual object ID (AV OBJECT ID) fields 1174 and 2174, and the profile/level (AV OBJECT PRO/LVL) fields 1175 and 2175 described above with respect to FIGS. 1 and 2. However, it should also be appreciated that the audio-visual object count (COUNT) field 3173, the local audio-visual object ID (LOBID) fields 3174 and the audio-visual object profile/level (OPL) field 3175 go beyond the audio-visual object count (AV OBJECT COUNT) fields 1173 and 2173, the audio-visual object ID (AV OBJECT ID) fields 1174 and 2174, and the profile/level (AV OBJECT PRO/LVL) fields 1175 and 2175.

The audio-visual object count (AV OBJECT COUNT) field 3173 indicates the number of audio-visual objects in the expanded physical object table (EPOT) 3170. The audio-visual object profile/level (OPL) field 3175 contains a profile/level description for the audio-visual or BIFS object being defined by this entry in the expanded physical object table (EPOT) 3170. The different audio-visual object instances count (ICOUNT) field 3177 indicates the number of different object instances for the audio-visual or BIFS object being defined by the this entry in the expanded physical object table (EPOT) 3170. The one or more local audio-visual object ID (LOBID) fields 3174 are substituted for the audio-visual object ID (AV OBJECT ID) fields 1174 and 2174 in the MPEG-4 standard, while the one or more first segment of logical audio-visual object instance (FSLOI) fields 3176 are substituted for the audio-visual object offset (AV OBJECT OFFSET) field 1176 in the MPEG-4 standard. Each one of the one or more local audio-visual object ID (LOBID) fields 3174 indicates the local audio-visual object ID assigned to a particular instance of the audio-visual or BIFS object being defined by the this entry in the expanded physical object table (EPOT) 3170. Similarly, each one of the one or more first segment of logical audio-visual object instance (FSLOI) fields 3176 indicates the offset, from the beginning of the MPEG-4 file 1000 or 2000 to the segment 1200 or 2200 in which the particular instance of the audio-visual object or the BIFS information being defined by this entry in the expanded physical object table (EPOT) 3170 first occurs in the MPEG-4 file 1000 or 2000.

FIG. 6 outlines one exemplary embodiment of a method according to this invention for using the expanded physical object table (EPOT) 3173. Beginning in step 400, control continues to step 410, where the expanded physical object table (EPOT) 3170 corresponding to one audio-visual object defined in the one or more local audio-visual object ID (LOBID) fields 3174 is looked up. Then, in step 420, the one or more first segment of logical audio-visual object instance (FSLOI) fields 3176 associated with the first audio-visual object defined in the one or more local audio-visual object ID (LOBID) fields 3174 is accessed. Next, in step 430, the next segment offset position (NSOFF) is set equal to the first segment of logical audio-visual object instance (FSLOI) fields 3176 associated with the first audio-visual object defined in the one or more local audio-visual object ID (LOBID) fields 3174 determined in step 420. Control then continues to step 440.

In step 440, the location of a pointer labeled POSITION is incremented to the next segment offset position (NSOFF). Next, in step 450, a current list of object identifiers (CURRLOBID) is set equal to the local object IDs defined in the one or more local audio-visual object ID (LOBID) fields 3174. Then, in step 460, the access layer data unit (AL PDU) table 1240, or the multiplexer protocol data unit (MUX PDU) table 2260, which are species of the segment object table (SOT), corresponding to the current list of object identifiers (CURRLOBID) is looked up. Control then continues to step 470.

In step 470, the access layer data unit offset (AL PDU OFFSET) field 1245, or the multiplexer protocol data unit (MUX PDU OFFSET) field 2265, corresponding to the current list of object identifiers (CURRLOBID), is located. The access layer data unit offset and the multiplexer protocol data unit offset are species of the local segment offset (LSOFF). Additionally, in step 470, the access layer data unit size (AL PDU SIZE) field 1247, or the multiplexer protocol data unit size (MUX PDU SIZE) field 2267, corresponding to the current list of object identifiers (CURRLOBID), is located. The access layer data unit size and the multiplexer protocol data unit size are species of the local access layer data unit size (LUS). Then, in step 480, the access layer data unit offset or the multiplexer protocol data unit offset corresponding to the current list of object identifiers (CURRLOBID), and the access layer data unit size or the multiplexer protocol data unit corresponding to the current list of object identifiers (CURRLOBID) are accessed. Next, in step 490, the identified access layer data units (AL PDUs) 1251 in the segment 1200 or the identified multiplexer protocol data unit (MUX PDU) 2251 in the segment 2200, are loaded and processed. Control then continues to step 500

In step 500, the continuity flags (CF), which are stored in the access layer data unit continuity (AL PDU CONTINUITY) field 1246 or the multiplexer protocol data unit continuity (MUX PDU CONTINUITY) field 2266, are parsed. Then, in step 510, the parsed continuity flags are checked to determine whether the current access layer data unit (AL PDU) 1251, or the multiplexer protocol data unit (MUX PDU) 2251, pointed to by the pointer POSITION is the last or only access layer data unit (AL PDU) 1251, or the multiplexer protocol data unit (MUX PDU) 2251, for the current instance of the current object. If the continuity flags indicate that the current access layer data unit (AL PDU) 1251, or the multiplexer protocol data unit (MUX PDU) 2251, pointed to by the pointer POSITION is the last or only access layer data unit (AL PDU) 1251, or the multiplexer protocol data unit (MUX PDU) 2251, for the current instance of the current object, control jumps to step 530. Otherwise, if there are additional access layer data units (AL PDUs) 1251, or the multiplexer protocol data unit (MUX PDU) 2251, for the current instance of the current object, control continues to step 520.

In step 520, the next segment offset position (NSOFF) is accessed. Control then jumps back to step 440. In contrast, in step 530, the current list of object identifiers (CURRLOBID) is incremented to the next element of the one or more local audio-visual object ID (LOBID) fields 3174 of the expanded physical object table (EPOT). Then, in step 540, the control routine ends.

When using the expanded physical object table (EPOT) 3170 as outline above, random access of the audio-visual object data can be streamlined by removing the lookup mechanism of the segment object table (SOT). The expanded physical object table (EPOT) 3170 can be further extended to include the offsets directly to the data objects instead of the beginning of the segment containing the objects by means of a next object offset (NOFF) variable and a local access layer data unit size (LUS) field. The access layer data unit size (LUS) has not been used before as a controlling variable during data transmission. However, by using the access layer data unit size (LUS) as a variable during data transmission, the device that is receiving the transmitted data will be able to determine whether it has sufficient memory available to store the received data and whether all of the data has been received.

It should also be appreciated that method outlined in FIG. 6 may be controlled by the file format interface 120 shown in FIG. 3.

The data structures, file formats, systems and methods of this invention provide a third exemplary embodiment of the physical object tables (POTs) 1170 and 2170 shown in FIGS. 1 and 2. This third exemplary embodiment of the physical object tables (POTs) 1170 and 2170 alters the physical object table structure of the physical object tables (POTs) 1170 and 2170 to provide a FAT physical object table (FPOT) 4170. As indicated above with respect to the expanded physical object table 3170, the FAT physical object table (FPOT) 3170 includes a description of all the objects that are physically present or contained in the file.

Figure 7:
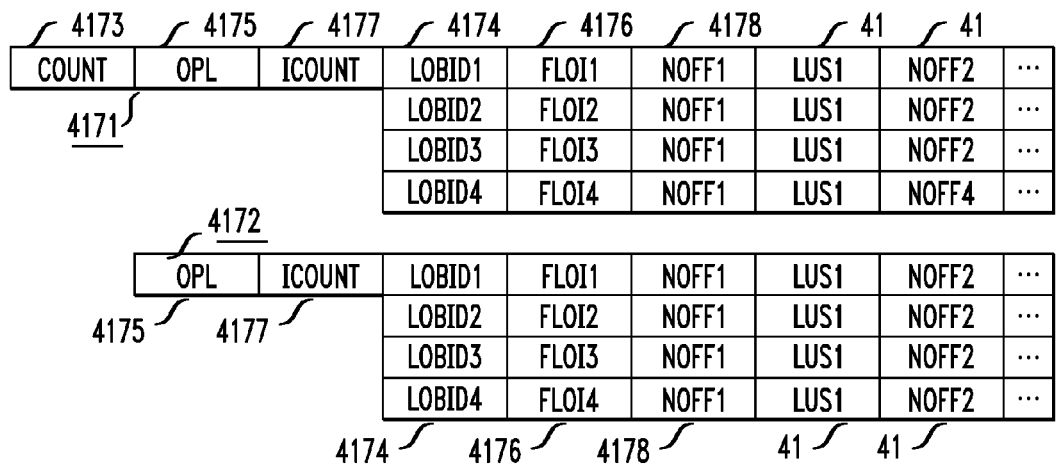
FIG. 7 illustrates the format of a third exemplary embodiment of the physical object table of the invention.

As shown in FIG. 7, the FAT physical object table (FPOT) 4170 includes a first audio-visual object description entry 4171 for a first audio-visual object described in the MPEG-4 file 1000 or 2000, and zero, one or more second audio-visual object description entries 4172 for each additional audio-visual object described in the MPEG-4 file 1000 or 2000. The first audio-visual object description entry 1171 of the FAT physical object table (FPOT) 4170 includes an audio-visual object count (COUNT) field 4173, one or more local audio-visual object ID (LOBID) fields 4174, an audio-visual object profile/level (OPL) field 4175, a different audio-visual object instances count (ICOUNT) field 4177, one or more first logical audio-visual object instance (FLOI) fields 4176, one or more pairs of next object offset (NOFF) fields 4178 and 4179, and one or more local access layer data unit size (LUS) fields 4180. Each second audio-visual object description entry 4172 includes one or more local audio-visual object ID (LOBID) fields 4174, the audio-visual object profile/level (OPL) field 4175, the different audio-visual object instances count (ICOUNT) field 4177, the one or more first logical audio-visual object instance (FLOI) fields 4176, the one or more pairs of next object offset (NOFF) fields 4178 and 4179, and one or more local access layer data unit size (LUS) fields 4180, but does not include the audio-visual object count (COUNT) field 4173.

The audio-visual object count (AV OBJECT COUNT) field 4173 indicates the number of audio-visual objects in the FAT physical object table (FPOT) 3170. The audio-visual object profile/level (OPL) field 4175 contains a profile/level description for the audio-visual or BIFS object being defined by this entry in the FAT physical object table (FPOT) 3170. The different audio-visual object instances count (ICOUNT) field 3177 indicates the number of different object instances for the audio-visual or BIFS object being defined by the this entry in the FAT physical object table (FPOT) 3170. Each one of the one or more local audio-visual object ID (LOBID) fields 3174 indicates the local audio-visual object ID assigned to a particular instance of the audio-visual or BIFS object being defined by the this entry in the FAT physical object table (FPOT) 3170.

The one or more first logical audio-visual object instance (FLOI) fields 4176 in the FAT physical object table (FPOT) 4170 are substituted for the one or more first segment of logical audio-visual object instance (FSLOI) fields 3176 in the expanded physical object table (EPOT). Each one of the one or more first logical audio-visual object instance (FLOI) fields 4176 directly indicates the position in the MPEG-4 file 1000 or 2000 of the corresponding instance of the audio-visual object or the BIFS information being defined by this entry. Each one of the one or more pairs of next object offset (NOFF) fields 4178 and 4179 and each of the one or more local access layer data unit size (LUS) fields 4180 incorporate directly into the FAT physical object table (FPOT) 4170 the access layer data unit offset and the access layer data unit size, or the multiplexer protocol data unit offset and the multiplexer protocol data unit size that were indirectly obtained in step 470 of FIG. 6. That is, next object offset (NOFF) fields 4178 and 4179 and the local access layer data unit size (LUS) field 4180 store the next object offsets (NOFFs) and the local access layer data unit sizes (LUSs) relative to each segment.

Figure 8:
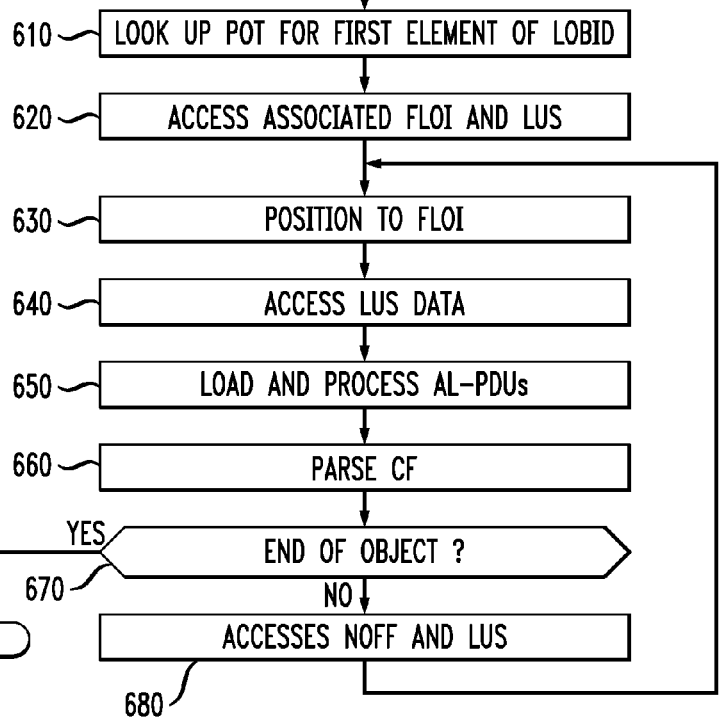
FIG. 8 is a flowchart outlining one exemplary method for accessing data stored using the third exemplary embodiment of the physical object table of the invention.

FIG. 8 outlines one exemplary embodiment of a method according to this invention for using the FAT physical object table (FPOT) 4173. Beginning in step 600, control continues to step 610, where the FAT physical object table (FPOT) 4170 corresponding to a first audio-visual object defined in the one or more local audio-visual object ID (LOBID) fields 4174 is looked up. Then, in step 620, one of the one or more first logical audio-visual object instance (FLOI) fields 4176 and the access layer data unit size (LUS) field 4180 associated with the first audio-visual object defined in the one or more local audio-visual object ID (LOBID) fields 4174 are accessed. Next, in step 630, the location of a pointer labeled POSITION is incremented to the location of the first object instance indicated by the accessed first logical audio-visual object instance (FLOI) field 4176. Control then continues to step 640.

In step 640, the access layer data unit size set forth in the accessed access layer data unit size (LUS) field 4180 is accessed. Next, in step 650, the access layer data units (AL PDUs) 1251, or the multiplexer protocol data units (MUX PDUs) 2251, in the segment are loaded and processed. Then, in step 660, the continuity flags (CF), which are stored in the access layer data unit continuity (AL PDU CONTINUITY) field 1246 or the multiplexer protocol data unit continuity (MUX PDU CONTINUITY) field 2266, are parsed. Control then continues to step 670.

In step 670, the parsed continuity flags are checked to determine whether the current access layer data unit (AL PDU) 1251, or the current multiplexer protocol data unit 2251, pointed to by the pointer POSITION is the last or only access layer data unit (AL PDU) 1251, or the current multiplexer protocol data unit 2251, for the current instance of the current object. If the continuity flags indicate that the current access layer data unit (AL PDU) 1251, or the current multiplexer protocol data unit 2251, pointed to by the pointer POSITION is the last or only access layer data unit (AL PDU) 1251, or the current multiplexer protocol data unit 2251, for the current instance of the current object, control jumps to step 690. Otherwise, if there are additional access layer data units (AL PDUs) 1251, or if there are additional multiplexer protocol data units (MUX PDUs) 2251, for the current instance of the current object, control continues to step 680.

In step 680, the corresponding pair of next object offset (NOFF) fields 4178 and 4179 and the corresponding local access layer data unit size (LUS) fields 4180 for the first audio-visual object defined in the one or more local audio-visual object ID (LOBID) fields 4174 are accessed and the and the access layer data unit size (LUS) is determined. Control then jumps back to step 630 to increment the pointer POSITION to the next location of the first object instance (FLOI) and subsequently access the access layer data unit size (LUS). In contrast, in step 690, the control routine ends.

It should also be appreciated that method outlined in FIG. 8 may be controlled by the file format interface 120 shown in FIG. 3.

Throughput for MPEG-4 data access is thus faster according to the third exemplary embodiment of the physical object table according to this invention, because all the information necessary for accessing the objects is contained in the FAT physical object table (FPOT). Such an approach also simplifies a backward search, i.e., reverse traversal, because all the information necessary to access the objects is contained in the FAT physical object table (FPOT). Thus, implementation using the FAT physical object table (FPOT) structure is the preferred mode for file editing. Further, the FAT physical object table (FPOT) simplifies file conversion into a basic streaming file with or without data access via sequential data scanning based on segment start codes (SSC) stored in the segment start code (SEGMENT START CODE) fields 1220 or 2220.

Figure 9:
FIG. 9 illustrates the file format of a file using the third exemplary embodiment of the physical object table of the invention.

In the data structures according to the third exemplary embodiment of the physical object table, the data following the FAT physical object table (FPOT) 4170 is a concatenation of access layer data units (AL PDUs) 1251, or the multiplexer protocol data units (MUX PDUs) 2251. The format illustrated in FIG. 9 is memory-oriented and requires large memory for the FAT physical object table (FPOT). However, the format allows easy on-the-fly separation of the data access information, such as, for example, the FAT physical object table (FPOT) entries 4171 and 4172 and the object data, such as, for example, the access layer data units (AL PDUs) 1251, or the multiplexer protocol data units (MUX PDUs) 2251. Therefore, the data access information and the object data can be sent over a network with different priorities. When indexing information is not required at the receiver, which is usually the case for most applications, the data access information does not need to be transmitted at all.

The data structures, file formats, systems and methods of this invention provide a fourth exemplary embodiment of the physical object tables (POTs) 1170 and 2170 shown in FIGS. 1 and 2. This fourth exemplary embodiment of the physical object tables (POTs) 1170 and 2170 alters the physical object table structure of the FAT physical object table (FPOT) 4170 to provide a local physical object table (LPOT) 5170. As indicated above with respect to the FAT physical object table 3170, the local physical object table (FPOT) 3170 includes a description of all the objects that are physically present or contained in the file.

The local physical object table (LPOT) 5170 can be more efficiently managed than the FAT physical object table (FPOT) 4170. That is, in some cases, a large FAT physical object table (FPOT) 4170 requires extensive memory resources and creates problems with the controller. For example, in mobile units containing scarce controller/memory resources, using the FAT physical object table (FPOT) structure may be difficult. Thus, the local physical object table (LPOT) 5170 simplifies the structure of the FAT physical object table (FPOT) by distributing the next object offset (NOFF) fields 4178 and 4179 and the access layer data unit size (LUS) field 4180 into the access layer data units (AL PDUs) 1251, or the multiplexer protocol data units (MUX PDUs) 2251.

Figure 10:
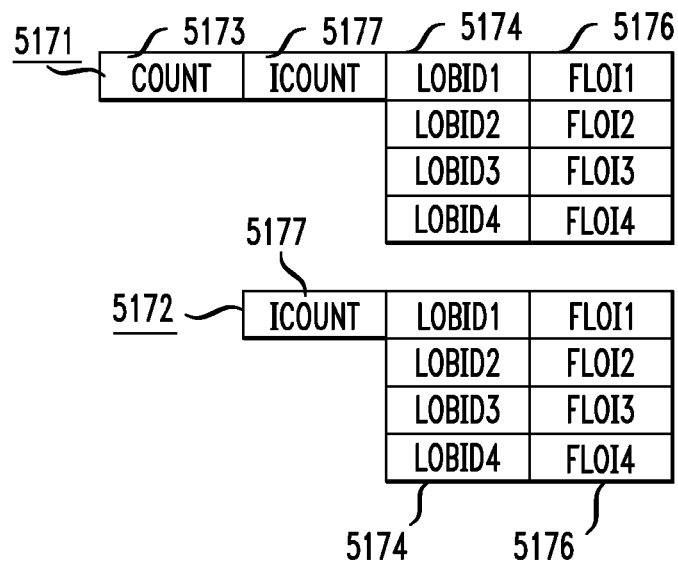
FIG. 10 illustrates the format of a fourth exemplary embodiment of the physical object table of the invention.
Figure 11:
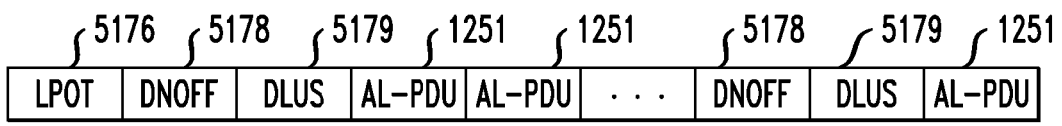
FIG. 11 illustrates the file format of a file using the fourth exemplary embodiment of the physical object table of the invention.

As shown in FIG. 10, the local physical object table (LPOT) 5170 includes a first audio-visual object description entry 5171 for a first audio-visual object described in the MPEG-4 file 1000 or 2000, and zero, one or more second audio-visual object description entries 5172 for each additional audio-visual object described in the MPEG-4 file 1000 or 2000. The first audio-visual object description entry 5171 of the local physical object table (LPOT) 5170 includes an audio-visual object count (COUNT) field 5173, one or more local audio-visual object ID (LOBID) fields 5174, a different audio-visual object instances count (ICOUNT) field 5177, and one or more first logical audio-visual object instance (FLOI) fields 5176. Each second audio-visual object description entry 5172 includes one or more local audio-visual object ID (LOBID) fields 5174, the different audio-visual object instances count (ICOUNT) field 5177, and the one or more first logical audio-visual object instance (FLOI) fields 5176, but does not include the audio-visual object count (COUNT) field 5173.

However, the first and second audio-visual object description entries 5171 of the local physical object table (LPOT) 5170 do not include the audio-visual object profile/level (OPL) field 4175, the pairs of next object offset (NOFF) fields 4178 and 4179, or the local access layer data unit size (LUS) fields 4180 of the FAT physical object table (FPOT) 4170 described above. Instead, the local physical object table (LPOT) 5170 is followed 1 by sets of distributed next object chunk offset (DNOFF) fields 5178 and distributed access layer data unit size (DLUS) fields 5179. Each distributed next object chunk offset (DNOFF) field 5178 stores distributed next object chunk offset (DNOFF) information that contains an offset value required for positioning to the first access layer data unit (AL PDU) 1251 in the next segment 1200.

In particular, the sets of distributed next object chunk offset (DNOFF) fields 5178 and distributed access layer data unit size (DLUS) fields 5179 are intermixed with the access layer data units (AL PDUs) 1251, or the multiplexer protocol data units (MUX PDUs) 2251. Specifically, a first distributed next object chunk offset (DNOFF) field 5178 is the first field before the first access layer data unit (AL PDU) 1251 of the object referred to by the distributed next object chunk offset information in the first distributed next object chunk offset (DNOFF) field. A distributed access layer data unit size (DLUS) field 5179 immediately follows each distributed next object chunk offset (DNOFF) field 5178.

Data access using the local physical object table (LPOT) 5170, the distributed next object chunk offset (DNOFF) field 5178 and the distributed access layer data unit size (DLUS) field 5179 may be performed, for example, by a data access method that manipulates loading and processing the access layer data units (AL PDUs) 1251 based on the distributed next object chunk offset information stored in the distributed next object chunk offset (DNOFF) fields 5178.

Figure 12:
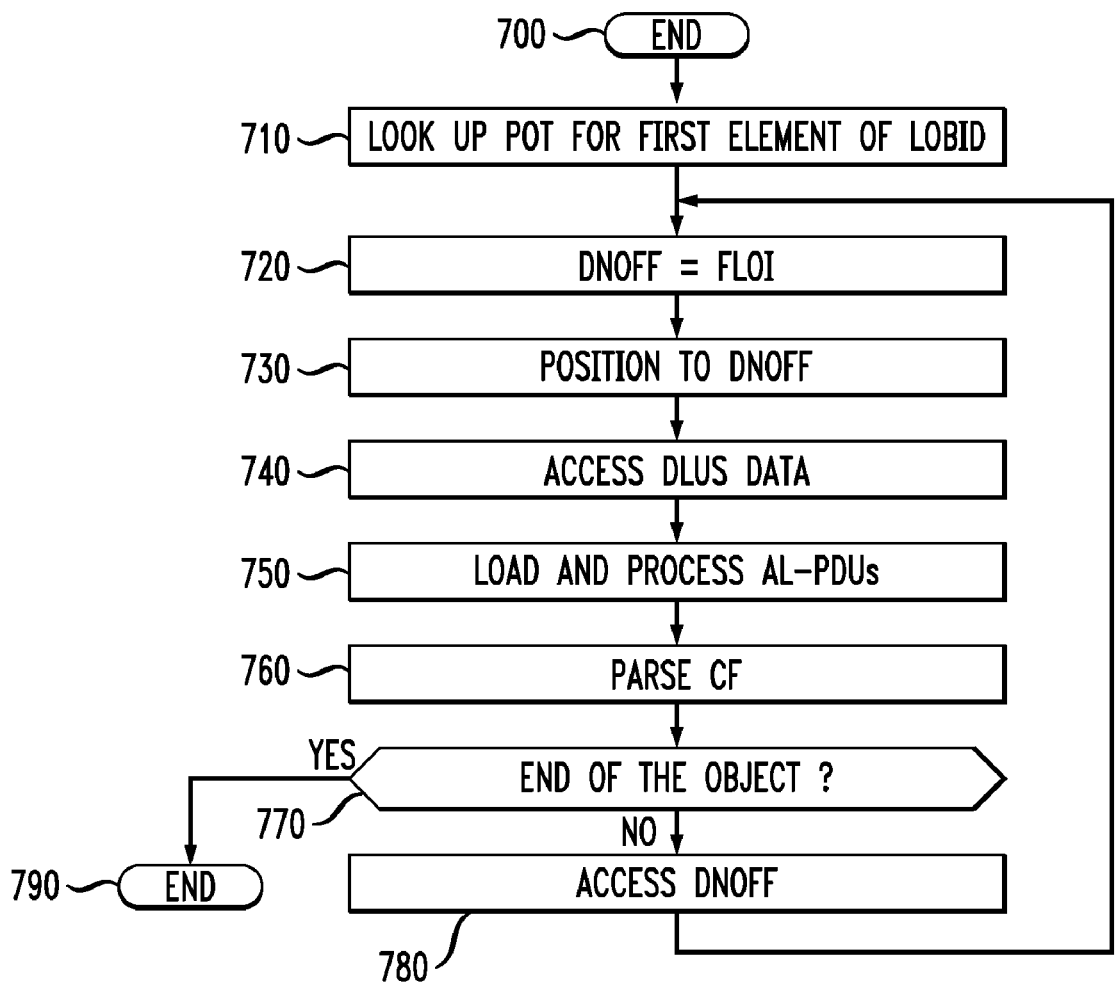
FIG. 12 is a flowchart outlining one exemplary method for accessing data stored using the fourth exemplary embodiment of the physical object table of the invention.

FIG. 12 outlines one exemplary embodiment of a method according to this invention for using the local physical object table (LPOT) 5173. Beginning in step 700, control continues to step 710, where the local physical object table (LPOT) 4170 corresponding to a first audio-visual object defined in the one or more local audio-visual object ID (LOBID) fields 5174 is looked up, and one of the one or more first logical audio-visual object instance (FLOI) fields 5176 associated with the first audio-visual object defined in the one or more local audio-visual object ID (LOBID) fields 4174 is accessed. Then, in step 720, the value for distributed next object chunk offset (DNOFF) information is set equal to the value of one of the first logical audio-visual object instance (FLOI) fields 5176. Next, in step 730, the location of a pointer labeled POSITION is incremented to the location indicated by the distributed next object chunk offset information. Control then continues to step 740.

In step 740, the distributed access layer data unit size (DLUS) data in the distributed access layer data unit size (DLUS) field 5179 is accessed. Next, in step 750, the access layer data units (AL PDUs) 1251, or the multiplexer protocol data units (MUX PDUs) 2251, in the segment are loaded and processed. Then, in step 760, the continuity flags (CF), which are stored in the access layer data unit continuity (AL PDU CONTINUITY) field 1246 or the multiplexer protocol data unit continuity (MUX PDU CONTINUITY) field 2266, are parsed. Control then continues to step 770.

In step 770, the parsed continuity flags are checked to determine whether the current access layer data unit (AL PDU) 1251, or the current multiplexer protocol data unit 2251, pointed to by the pointer POSITION is the last or only access layer data unit (AL PDU) 1251, or the current multiplexer protocol data unit 2251, for the current instance of the current object. If the continuity flags indicate that the current access layer data unit (AL PDU) 1251, or the current multiplexer protocol data unit 2251, pointed to by the pointer POSITION is the last or only access layer data unit (AL PDU) 1251, or the current multiplexer protocol data unit 2251, for the current instance of the current object, control jumps to step 790. Otherwise, if there are additional access layer data units (AL PDUs) 1251, or if there are additional multiplexer protocol data units (MUX PDUs) 2251, for the current instance of the current object, control continues to step 780.

In step 880, the distributed next object chunk offset (DNOFF) information in the distributed next object chunk offset (DNOFF) field 5178 is accessed. Control then jumps back to step 720 to sets the value of distributed next object chunk offset (DNOFF) information to be equal to the value of one of the first logical audio-visual object instance (FLOI) fields 5176. In contrast, in step 790, the control routine ends.

It should also be appreciated that method outlined in FIG. 12 may be controlled by the file format interface 120 shown in FIG. 3.

The above-outlined descriptions of the data structures, file formats, systems and methods of this invention are exemplary only, and variations in construction and implementation will occur to persons skilled in the art. For instance, with respect to FIGS. 10-12, data access may be similarly performed via sequential data scanning (SSCA) based on the segment start codes stored in the segment start code (SEGMENT START CODE) fields 1220 or 2220 or the segment size stored in the segment size (SEGMENT SIZE) fields 1230 or 2230, and the distributed next object chunk offset (DNOFF) information stored in the distributed next object chunk offset (DNOFF) fields 5178 and the distributed access layer data unit size stored in the distributed access layer data unit size (DLUS) fields 5179 described above with respect to the fourth exemplary embodiment of the physical object table. Accessing the data using segments would be faster in locating the object chunks but slower in locating the local object IDs (LOBIDs), which requires parsing the access layer data units (AL PDUs).

Figure 13:
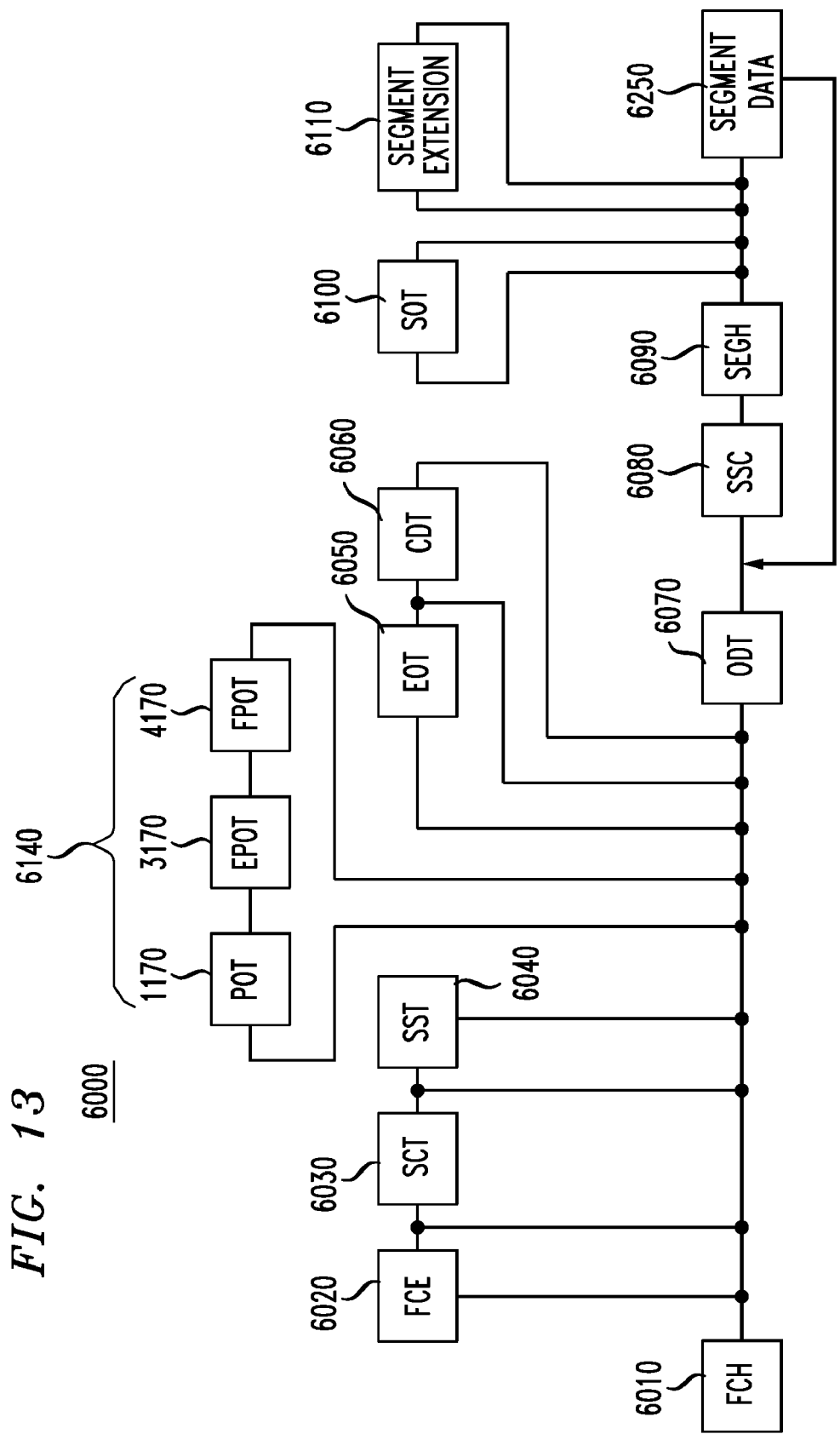
FIG. 13 is a block diagram outlining the file format of a file using the first or second exemplary embodiment of the file format structure according to the invention.

As shown in FIG. 13, a generic Integrated Intermedia Format (IIF) file 6000 includes a header followed by access tables, and finally one or more segments. The generic Integrated Intermedia Format (IIF) file 6000 includes a file configuration header (FCH) 6010, such as the headers 1100 and 2100 outlined above with respect to FIGS. 1-12, and a file configuration extension (FCE) field 6020. The generic Integrated Intermedia Format (IIF) file 6000 also includes a stream configuration table (SCT) 6030, scalable stream table (SST) 6040, an object table 6170 that is implemented by one of the physical object table (POT) 1170, the extended physical object table (EPOT) 3170 or the FAT physical object table (FPOT) 4170, an external object table (EOT) 6050, a content descriptor table (CDT) 6060, an object descriptor table (ODT) 6070, a segment start code (SEGMENT START CODE or SSC) field 6080, an segment header descriptor field (SEGH) 6090, a segment object table (SOT) 6100, a segment extension 6110 and the segment data 6250. In particular, as shown in FIG. 13, in the generic Integrated Intermedia Format (IIF) file 6000, the shaded tables are optional, and can be omitted based on the particular implementation of the generic Integrated Intermedia Format (IIF) file 6000 as discussed below.

FIG. 13 shows the components of the generic Integrated Intermedia Format (IIF) file 6000 having the access tables in the front. These tables may also be attached at the end by setting appropriate flags in the file configuration header (FCH) 6010. These tables are typically attached at the end when recording, as the access tables are not available at the beginning of such a presentation.

Random access to access units, i.e., frames, of an object is supported by means of indexing tools. Indexing of objects and access units in that object can be done globally. As shown in FIGS. 1, 2, 5, 7 and 10, the indexing information can be located in a contiguous space or in a distributed fashion with indexing information distributed over the media data. As discussed above with respect to FIGS. 10-12, the distributed indexing scheme results in lower memory utilization, as only a part of the access tables are loaded at a time.

Indexing is supported by means of several object access tables that vary in complexity and support distributed or global indexing. As outlined above with respect to FIGS. 1-12, the different access tables, as shown in FIG. 13, used in supporting random access include the physical object table (POT) 6170, implemented using one of the the physical object table (POT) 1170, the extended physical object table (EPOT) 3170 or the FAT physical object table (FPOT) 4170, the segment object table (SOT) 6100, the object descriptor table (ODT) 6070, and the content descriptor table (CDT) 6060. These access tables can be used in different combinations depending on application needs.

The physical object table (POT) 6170 provides a list of objects present in a file and has pointer to the segment that contains the first access unit of the object. The physical object table (POT) 6170 is exemplified by the physical object tables 1170 and 2170 described above with respect to FIGS. 1 and 2. As indicated above with respect to FIGS. 1 and 2, using the physical object table (POT) 1170 requires the segment object table (SOT) 6100 to access an access unit.

The segment object table (SOT) 6100 is a table that indexes all the access units in a segment. The segment object table (SOT) 6100 is used when the media data is organized into segments. The segment object table (SOT) 6100 is exemplified by the access layer data unit (AL PDU) table 1240 of FIG. 1 and the multiplexer protocol data unit (MUX PDU) table 2260 of FIG. 2.

The extended physical object table (EPOT) 3170 is used to index all access units of interest and to point to the segment object table (SOT) entry that corresponds to a particular access unit. The extended physical object table (EPOT) is exemplified by the extended physical object table (EPOT) 3170 shown in FIG. 5.

The FAT physical object table (FPOT) 4170 is an expanded version of the extended physical object table (EPOT). The FAT physical object table (FPOT) 4170 indexes all access units and includes their offsets and sizes. The FAT physical object table (FPOT) 4170 is sufficient by itself to enable random access. Thus, when the FAT physical object table (FPOT) 4170 is used as the physical object table (POT) 6170, the segment object table (SOT) 6100 can be omitted. The FAT physical object table (FPOT) is exemplified by the FAT physical object table (FPOT) 4170 shown in FIG. 7.

The object descriptor table (ODT) 6070 provides direct access to object descriptors. Each object descriptor contains all the essential information for a decoder to process a particular object. The object descriptors are the first pieces of information conveyed to a client during a session establishment.

The content descriptor table (CDT) 6060 is used to access an object's object content information (OCI).

A binary format of scene (BIFS) scene description stream is the most critical part of an MPEG-4 presentation and special handling might be necessary to communicate it to the user terminal. A BIFS scene description stream is identified in an Integrated Intermedia Format (IIF) file by assigning a unique two-byte ID (BIFS ID) for the binary format of scene (BIFS) scene description stream. This can also be done by decoding the object descriptors and examining the stream types. This BIFS ID is part of the file header and allows identifying and extracting the BIFS scene description data easily.

One disadvantage of the indexing schemes described above with respect to FIGS. 1-12 is the lack of direct time-based indexing. For example, it is not possible to access an access unit n seconds into the presentation without further processing the bit-rate and other parameters of the object. This has been identified but can be easily overcome by time-wrapping the access tables; i.e., associating segments of index tables with the presentation times of access units. However, although time-based access to individual objects is relatively straightforward, such functionality cannot be fully supported for an entire scene without parsing the scene description information. This is because scene description nodes contain fields that pertain to the temporal aspects of the presentation, thus making it impossible to decide if a particular object is used or not. One such field of a VRML node is, for example, the startTime field of the VRML VideoObject2D node.

The Integrated Intermedia Format (IIF) organizes the media data into segments. These segments usually correspond to a scene or to a higher level construct. Access units in a segment are optionally indexed in the segment object table (SOT) 6100. As indicated above with respect to FIGS. 1 and 2, a segment starts with a unique segment start code that can be used to uniquely identify the beginning of a segment. The segment header (SEGH) 6090 is a one-byte field that includes flags, such as, for example, the continuity flags stored in the continuity fields 1246 and 2266 that determine the type of the contents in a segment. Table 3 shows the bit assignments for bits 0-7 of the segment header (SEGH) 6090.

TABLE 3

Bit Assignments for the Segment Header (SEGH)

| BIT | HIGH (1) | LOW (0) |
|---|---|---|
| 0 | Size Field Present | Size Field Absent |
| 1 | Segment Empty | Segment Not Empty |
| 2 | Segment Object Table Present | Segment Object Table Absent |
| 3 | Segment Extension Present | Segment Extension Absent |
| 4-7 | Segment Type According to Table 4 | |

TABLE 4

Bit Assignments For The File Type Description Field

| BIT 4 | BIT 5 | BIT 6 | BIT 7 | TYPE OF SEGMENT |
|---|---|---|---|---|
| 0 | 0 | 0 | 0 | PDUs OF MANY OBJECTS |
| 0 | 0 | 0 | 1 | PDUs OF ONE OBJECT ONLY |
| 0 | 0 | 1 | 0 | OBJECT DESCRIPTORS (ODs) ONLY |
| 0 | 0 | 1 | 1 | OBJECT CONTENT INFORMATION (OCI) ONLY |
| 0 | 1 | 0 | 0 | BINARY FORMAT OF SCENE (BIFS) SCENE DESCRIPTION DATA ONLY |

The segment data could include access units that belong to a single object or to multiple objects, object descriptors only, object content information (OCI) data only, or scene description data only. This information is useful to prioritize the processing of data in a segment, because some types of data, for example, scene description data, is more critical to a presentation than other types of data.

Another aspect of this segment-based approach is the separation between the access tables and the actual media data itself. The media data contained in the segments is pure data and can be extracted easily for direct playback. This saves de-packetization time that would otherwise be necessary if additional information were packed with the access units.

Since all access units are indexed relative to the beginning of a segment, the contents of a segment can be edited with in a segment with changes made to only a single entry in the access table that points to the segments. Making changes to the FAT physical object table (FPOT) 4170 after an editing operation can be more complex. Another benefit of this segment-based approach is that this segment-based approach allows non-indexed areas in segments. These non-indexed areas are treated as free space. This might be a result of editing operation or could also be by design, such as when a content creator decides to leave some free space in segments for later use.

To stream data, a media streamer needs to have access to data units, i.e., the access units, the transport properties, such as, for example, the bit-rate, the maximum unit size, the minimum unit size and the like, of the objects. The media streamer needs to packetize the access units according to the selected transport protocol and deliver the packetized access units over a network. As the number of streams to be streamed increases, the computational power required for performing these seemingly insignificant tasks becomes a burden to the streaming engine, reducing its capacity. By making the task of access to data units easier, streaming performance can be improved. In the Integrated Intermedia Format (IIF), an object's properties, such as its average bit-rate, its peak bit-rate, its start time, its end time, and its duration, are made available in via the stream configuration table (SCT) 6030. The scalable stream table (SST) 6040 is a table that provides the base and enhancement layers for scalable streams. The overall nature of the MPEG-4 presentation, such as the average bandwidth, the peak bandwidth, and the average segment, are indicated in the file configuration extension (FCE) field 6020. Each of the file configuration extension (FCE) field 6020, the stream configuration table (SCT) 6030 and the scalable stream table (SST) 6040 are optional, as indicated in FIG. 13.

To further increase efficiency, the Integrated Intermedia Format (IIF) supports direct streaming. Direct streaming, as the name implies, translates to less work for the streaming engine. The idea behind direct streaming is to pre-compute the protocol-specific packet headers and include them along with the access units. A streamer would then extract the access units and the associated pre-computed packet headers and convey them to the network. This reduces the load and increases efficiency. However, since direct streaming is transport-protocol dependent, protocol-specific data needs to be included for each protocol the streamer supports.

In the Integrated Intermedia Format (IIF), this protocol-specific data is placed in a segment in the optional segment extension 6110. The segment extension 6110 contains timestamps and protocol specific information. In particular, the segment extension 6110 is a four-byte field that contains protocol-specific information about pre-packaged fields. That is, the segment extension 6110 should be regarded as a set of segment properties. It should also be appreciated that the access layer data (AL PDU), or segment object table, 1240 shown in FIG. 1 does not include the segment extension 6110 that is included with the segment object table (SOT) 6100 shown in FIG. 13. A drawback to this design is that only a single protocol can be supported in any one Integrated Intermedia Format (IIF), i.e., there cannot be support for more than one protocol in the same file.

The Integrated Intermedia Format (IIF) external object table (EOT) 6050 is used to indicate the presence of external objects and/or external links in an MPEG-4 file. External objects are audiovisual objects that are referred to in the current file but are present in a different file. That different file may be located locally, such as on the current file system or remotely, such as over a networked system. This feature is necessary to support features such as local logo or ad insertion in a presentation.

External objects facilitate using a set of files to store an MPEG-4 presentation. The external object table (EOT) 6050 is present if multiple files are used to store a single presentation or if there are any uniform resource locators (URLs) present in the scene description data or the elementary stream descriptors. The external object table (EOT) 6050 also lists external links. External links are the uniform resource locators (URLs) used in a presentation that might be activated as a result of user interaction. As such, the external links are part of the scene description data. The external links are necessary to ensure that the links are available during a presentation. Or, if the external links are not available during a presentation, the client can be warned prior to the beginning of a session. This is a useful check, as some missing links might interrupt the flow of a presentation. It is the responsibility of the server, or of a player during local playback, to ensure that the necessary resources are available to access external objects and/or external links during a presentation.

Based on the above-outlined Integrated Intermedia Format (IIF) building blocks and features, the Flexible Integrated Intermedia Format (Flexible-IIF) of this invention is a framework which allows an easy and programmable organization of the media-data inside the Integrated Intermedia Format (IIF). The Flexible Integrated Intermedia Format (Flexible-IIF) of this invention allows the dynamic encapsulation of semantically consistent information in object structures associated by common properties. The property structures, as well as the pointers to the raw media material, constitutes the meta-data. This allows the elementary streams to be reorganized to obtain, for example, a given presentation to the user, the elementary streams to stream over a given network support or the elementary streams to accommodate the available resources of a thin client.

In the Flexible Integrated Intermedia Format (Flexible IIF), for example, protocol-specific meta-data can be included to support multiple protocols and payload formats. Dynamic data reorganization is obtained by modifying only the meta-data. Extensibility of the Flexible Integrated Intermedia Format (Flexible-IIF) of this invention is obtained by adding new construction rules and possibly new property specifications in the meta-object.

Figure 14:
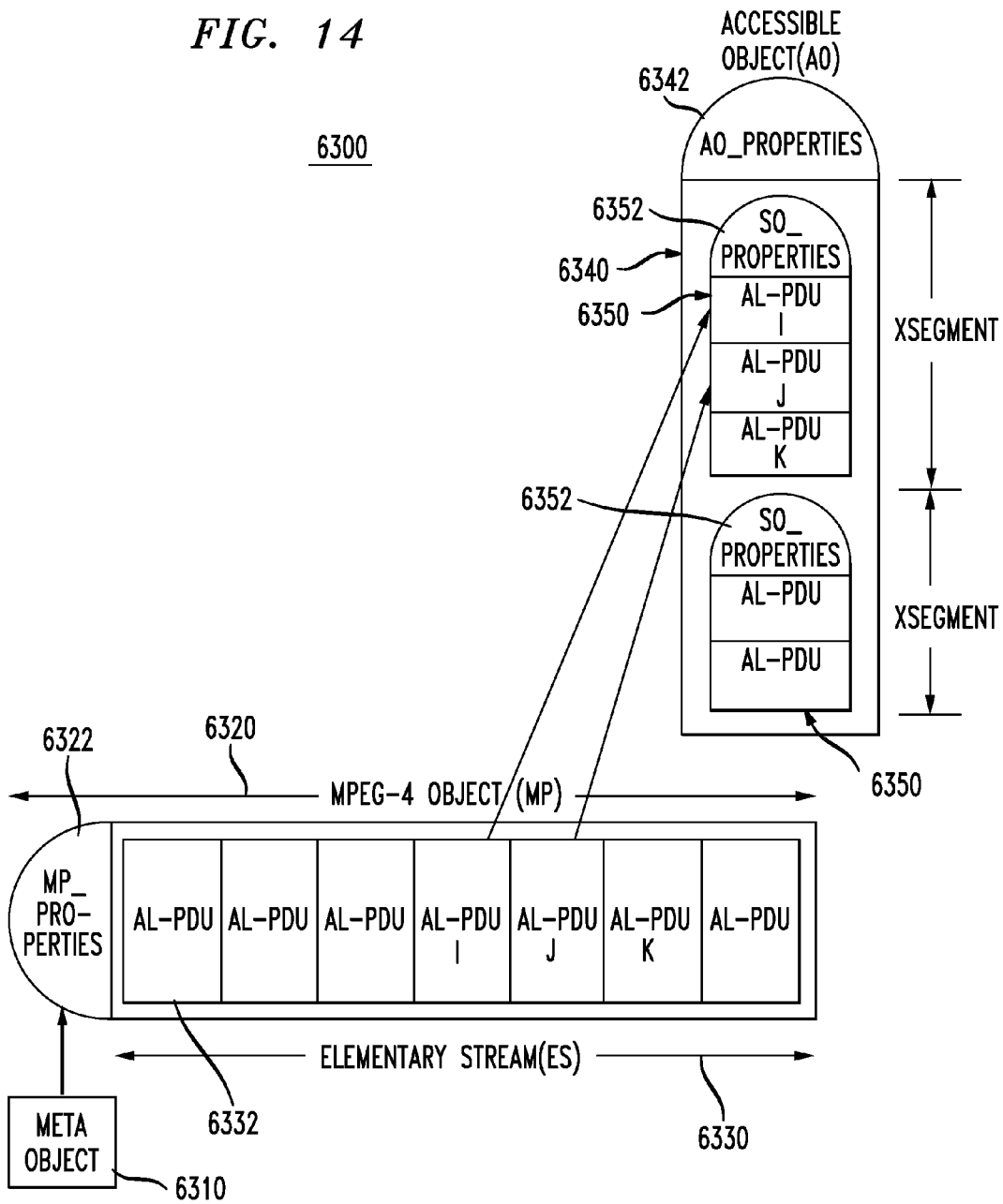
FIG. 14 is an exemplary embodiment of an accessible object and extended segment structure according to the invention.
Figure 15:
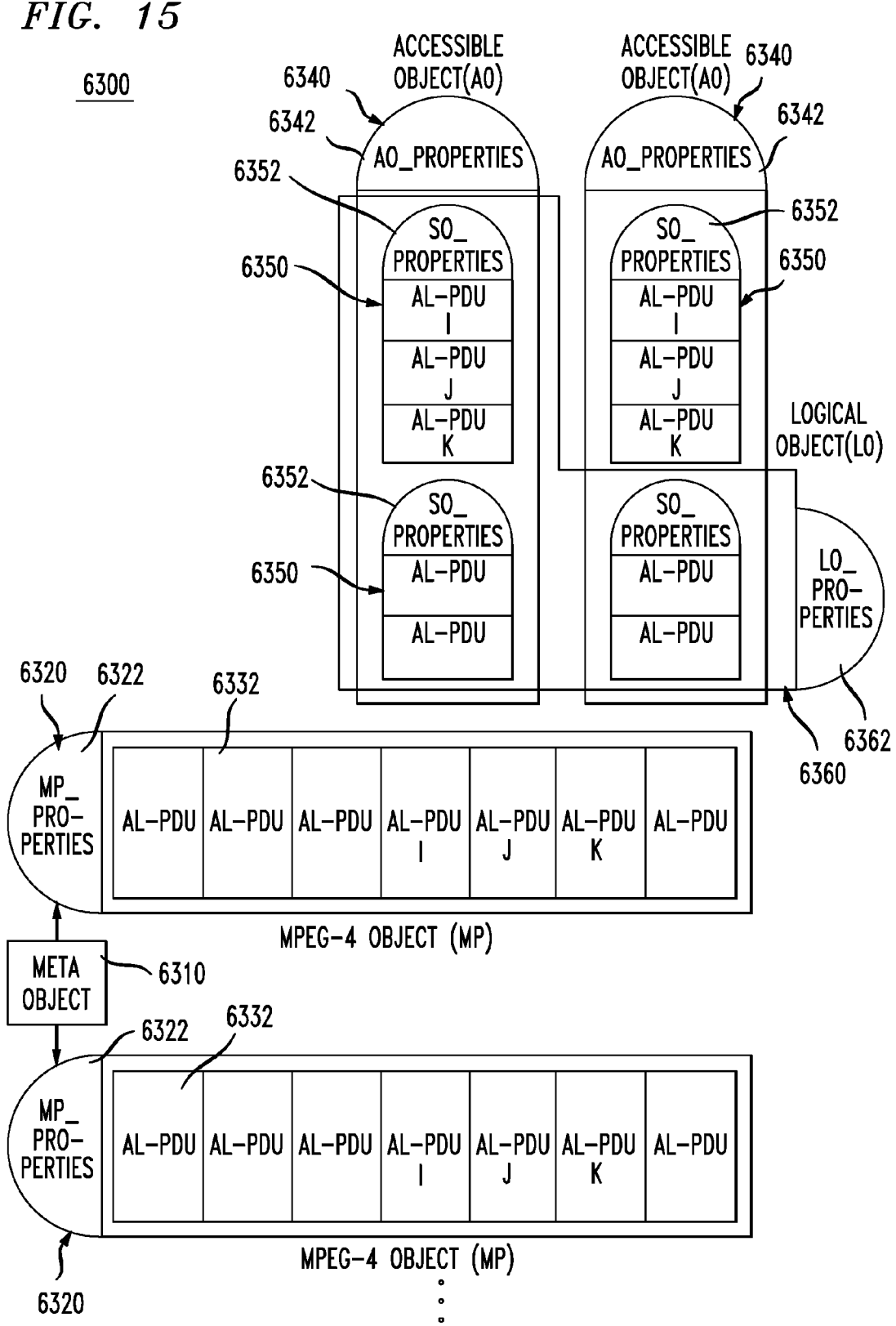
FIG. 15 is an exemplary embodiment of the structure of a logical object according to the invention.

As shown in FIGS. 14 and 15, in the Flexible Integrated Intermedia Format (Flexible-IIF) of this invention five meta-data structures or better objects have been defined. These meta-data structures include a "Meta object" structure 6310, an "MPEG-4 object" structure 6320, an "accessible object" structure 6340, an "Extended Segment" (XSEGMENT) structure 6350, and a "logical object" structure 6360.

As shown in FIGS. 14 and 15, the meta object (MO) 6310 is an object that contains information on how each accessible object and segment should be generated and a description of properties that are respectively associated with these objects. The meta-object (MO) 6310 carries only rules relative to the structural organization of accessible objects and extended segments. The meta-object (MO) 6310 does not duplicate information relative to the intrinsic characteristics of the elementary streams.

As shown in FIG. 14, the MPEG-4 object 6320 includes an MPEG-4 elementary stream 6330 with a set of properties (MP_Properties) 6322 associated to the MPEG-4 elementary stream 6330. Pointers to the object descriptors of the MPEG-4 elementary streams 6330 is part of the MP_Properties 6322.

The current list of MP_Properties 6322 includes the number of access layer data units (AL PDUs) 6332 contained in the MPEG-4 object 6320, the size of the access unit, the number of resynchronization points per access unit, the average number of resynchronization points per access layer data unit (AL PDU), which is typically 1 or less than 1, and the access layer data unit (AL PDU) table, which is equivalent to the FAT physical object table (FPOT) 4170 discussed above with respect to FIG. 7.

The extended segment (XSEGMENT) 6350 is a fragment of an accessible object 6340 generated according to the meta-object (MO) 6310 and a set of properties (SEG_Properties) 6352 associated to the extended segment (XSEGMENT) 6350. As a default rule, a segment consists of one access layer data unit (AL PDU) or an integer number of access layer data units (AL PDUs). Such default rules can be overridden and made media-dependent or network-dependent. Some of the most important SEG_Properties 6352 are an access layer data unit (AL PDU) table equivalent to the segment object table (SOT) 6100 discussed above with respect to FIGS. 1 and 2, the resynchronization point position, a Master or slave flag and an Extended Segment Temporal Extension.

That is, the extended segment (XSEGMENT) is a segment structure that contains multiple access layer data units (AL PDUs) and the properties associated with these multiple access layer data units (AL PDUs). Thus, the extended segment (XSEGMENT) shown in FIG. 4 is in general a superset of the segment 6250.

An accessible object (AO) 6340 is a uniquely decodable set of temporally adjacent extended segments (XSEGMENTs) 6350 with an associated set of AO_Properties 6342. An accessible object (AO) 6340 has the property that all the segments belong to the same object and are contiguous in time. The AO_properties 6342 include the Segment table, the AO Temporal extension, the number of extended segments (XSEGMENT) 6350 contained in the accessible object (AO) 6340, the segment size, if constant, and any resynchronization points, if present. FIG. 14 shows an example of the structure of an accessible object (AO) 6340 and the extended segments (XSEGMENTs) 6350.

As shown in FIG. 15, a logical object (LO) 6360 is a composition of different addressable objects (AOs) 6340 or extended segments (XSEGMENTs) 6350, according to the meta-data. It should be appreciated that a logical object (LO) 6360 does not have the property of temporal adjacency as does the addressable object (AO) 6340 or the extended segment (XSEGMENT) 6350. The structure of the logical object (LO) 6360 is shown in FIG. 15. A non-exhaustive list of LO_Properties 6362 include the LO Temporal extension, the Logical Object Table, the list of Resynchronization points and the list of decodability points.

Based on the above-outlined exemplary embodiments, the data structures, file formats, systems and methods of this invention enable new applications that make use of a variety of random access audio-visual features. Types of client applications enabled by the data structures, file formats, systems and methods of this invention include video and audio conferencing, video gaming and other interactive entertainment. The data structures, file formats, systems and methods of this invention can be used to arrange audio-visual data efficiently in any known or later developed memory structure, such as on a DVD, on a CD ROM, on a hard disk, on a floppy disk, in RAM or in ROM or the like. Necessary control structures can be realized in hardware as well as software, as will be appreciated by persons skilled in the art, and the design of software or devices that utilize the file format will depend on particular applications.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

We claim:

1. A non-transitory computer-readable medium storing computer-readable data processed from input presentation data including identifiable objects, the processed data stored by a method comprising:
   individually coding each identifiable object to yield coded data;
   organizing the coded data into data units by access layer;
   storing the data units within a plurality of segments, each segment comprising a segment table in a header portion thereof and those access layer data units that are members of a respective segment, there being one entry in the segment table for each data unit stored therein, wherein the header portion comprises data representing a size of an access unit, a number of resynchronization points per data unit, an average number of resynchronization points per one of the data units, and a data unit table; and
   storing data of an object for access, including an object header and identifiers of a group of layer data units, each data unit of the data units being a member of a same respective object, wherein, the data of the object for access are used to deliver at least one of audio content and video content.

2. The non-transitory computer-readable medium of claim 1, wherein the object header includes data representing the segment table, a temporal extension to the object, and a number of temporally contiguous data units contained in the object.

3. The non-transitory computer-readable medium of claim 1, wherein the object header further indicates a segment size for segments having a constant size and further indicates whether resynchronization points were present in the coded data.

4. The non-transitory computer-readable medium of claim 2, wherein the temporally contiguous access layer data units are organized into a plurality of extended segments, the extended segments each represented by an extended segment header.

5. The non-transitory computer-readable medium of claim 4, wherein the extended segment header includes data representing an access layer data unit table, resynchronization point positions, at least one of a master and a slave flag, and an extended segment temporal extension.

6. A method for storing coded data organized into access layer data units from input presentation data, the method comprising:
 storing the access layer data units within a plurality of segments, each segment comprising a segment table in a header portion thereof and those access layer data units that are members of a respective segment, there being one entry in the segment table for each access layer data unit stored therein, wherein the header portion comprises data representing a size of an access layer data unit, a number of resynchronization points per access layer data unit, an average number of resynchronization points per one of the data units, and a data unit table, and wherein, the access layer data units are used to deliver at least one of audio content and video content.

7. A non-transitory computer-readable medium storing computer-readable data processed from presentation data including identifiable objects, the data stored according to a method comprising:
 coding input presentation data by:
  identifying objects from within the presentation data;
  coding each object individually;
  organizing the coded data into data units by access layer; and
 storing the data units within a plurality of segments, each segment comprising a segment table in a header portion thereof and those access layer data units that are members of a respective segment, there being one entry in the segment table for each data unit stored therein, wherein the header portion comprises data representing a size of an access unit, a number of the resynchronization points per data unit, an average number of resynchronization points per one of the data units, and a data unit table; and
 storing data of an object for access, including an object header and identifiers of a group of layer data units, each data unit of the data units being a member of a same respective object, wherein, the data of the object for access are used to deliver at least one of audio content and video content.

8. The non-transitory computer-readable medium of claim 7, wherein the data units are not temporally adjacent.

9. The non-transitory computer-readable medium of claim 7, wherein the data units are members of different objects.

10. The non-transitory computer-readable medium of claim 7, wherein the object header comprises a logical header that includes data representing a logical object table, a logical object temporal extension, resynchronization points, and decodability points.

11. A non-transitory computer-readable medium storing computer-readable coded data organized into access layer data units processed from presentation data, the data stored according to a method comprising:
 storing the access layer data units within a plurality of segments, each segment comprising a segment table in a header portion thereof and those access layer data units that are members of a respective segment, there being one entry in the segment table for each access layer data unit stored therein, wherein the header portion comprises data representing a size of an access unit, a number of the resynchronization points per data unit, an average number of resynchronization points per one of the data units, and a data unit table, wherein, the stored the access layer data units are used to deliver at least one of audio content and video content.

12. The non-transitory computer-readable medium of claim 11, wherein the method of storing the data on the non-transitory computer-readable medium further comprises:
 storing a plurality of extended segments, each of the extended segments further comprising at least one of the access layer data units that include protocol specific data, the extended segments each represented by an extended segment header; and
 storing data of an accessible object, including an accessible object header and identifiers of the plurality of extended segments, each of the extended segments being a member of the same object.

13. The non-transitory computer-readable medium of claim 12, wherein the coded data is MPEG-4 data.

14. The non-transitory computer-readable medium of claim 13, wherein the method of storing the data on the computer-readable medium further comprises:
 storing a plurality of extended segments, each of the extended segments further comprising at least one of the access layer data units that include protocol specific data, the extended segments each represented by an extended segment header; and
 storing data of an accessible object, including an accessible object header and identifiers of the plurality of extended segments, each of the extended segments being a member of the same object.

* * * * *